United States Patent [19]

Huang et al.

[11] Patent Number: 5,758,354

[45] Date of Patent: *May 26, 1998

[54] APPLICATION INDEPENDENT E-MAIL SYNCHRONIZATION

[75] Inventors: Chu-Yi Huang, Beaverton; Michael Man-Hak Tso, Hillsboro, both of Oreg.

[73] Assignee: Intel Corporation, Santa Clara, Calif.

[*] Notice: The term of this patent shall not extend beyond the expiration date of Pat. No. 5,706,509.

[21] Appl. No.: 579,949

[22] Filed: Dec. 28, 1995

Related U.S. Application Data

[63] Continuation-in-part of Ser. No. 43,150, Apr. 28, 1995.

[51] Int. Cl.⁶ ........................................... G06F 17/30
[52] U.S. Cl. ................... 707/201; 395/182.18; 395/670; 395/676; 395/680
[58] Field of Search .................... 395/617, 650, 395/670, 676, 680, 182.18; 707/201, 200

[56] References Cited

U.S. PATENT DOCUMENTS

| | | | |
|---|---|---|---|
| 4,551,842 | 11/1985 | Segarra | 371/69 |
| 4,807,248 | 2/1989 | Pyatt et al. | 375/1 |
| 4,875,159 | 10/1989 | Cary et al. | 364/200 |
| 5,377,354 | 12/1994 | Scannell et al. | 395/650 |
| 5,592,664 | 1/1997 | Starkey | 395/600 |

Primary Examiner—Paul R. Lintz
Assistant Examiner—Jean M. Corrielus
Attorney, Agent, or Firm—Blakely, Sokoloff, Taylor & Zafman

[57] ABSTRACT

A method and an apparatus for synchronization of a first set of mail with a second set of mail at the message/folder level. A memory stores a mail synchronizer for application independent e-mail synchronization. A pseudo unique identification is generated for each message or folder in the mail boxes to be synchronized. An event log is then generated for each mail box. The memory also has a synchronization mechanism for making the first set of data and the second set of data equivalent by using the information in a Change List. A processor runs the mail synchronizer.

16 Claims, 35 Drawing Sheets

Figure 1
*(Prior Art)* — 10

| At T0 | At T1 | At T2 (AFTER MAIL BOX SYNC.) | |
|---|---|---|---|
| MB0 = [A, B, C, D] | MB0' = [E, B, C, D] | MB0'' = [E, B, C, D] | MB0'' = [A, B, C, F] |
| | | OR | |
| MB1 = [A, B, C, D] | MB1' = [A, B, C, F] | MB1'' = [E, B, C, D] | MB1'' = [A, B, C, F] |

Figure 2
— 20

| At T0 | At T1 | At T2 (AFTER MESSAGE/FOLDER SYNC.) |
|---|---|---|
| MB0 = [A, B, C, D] | MB0' = [E, B, C, D] | MB0'' = [E, B, C, F] |
| MB1 = [A, B, C, D] | MB1' = [A, B, C, F] | MB1'' = [E, B, C, F] |

Figure 4c-1

| Rm | Updated | Rm' | |
|---|---|---|---|
| Rp | Deleted | | |
| Rt | Updated | Rt' | |
| | Created | Ru | |
| 330 | 321 | 322 | 323 |

| Rx | Updated | Rx' | |
|---|---|---|---|
| Rz | Deleted | | |
| | Created | Ry | |
| | Received | Rz | |
| 334 | 335 | 336 | 337 |

MB0 — NOT-DELETE FLAG

| Rm | |
| Rn | |
| Rp | |
| Rq | |
| ⋮ | |

MB0' — NOT-DELETE FLAG

| Rm' | |
| Rn' | |
| Rp' | |
| ⋮ | |

732

| Case # | MBO Change | MB1 Change | MB0 Result | MB1 Result |
|---|---|---|---|---|
| 1 | Create R1 | No Change | R1+ | R1+ |
| 2 | Modify R1->R1' | No Change | R1->R1' | R1->R1' |
| 3 | Delete R1 | No Change | R1- | R1- |
| 4 | Modify Key R1->R1' | No Change | R1->R1' | R1-, R1'+ |
| 5 | No Change | Create R1 | R1+ | R1+ |
| 6 | No Change | Modify R1->R1' | R1->R1' | R1->R1' |
| 7 | No Change | Delete R1 | R1- | R1- |
| 8 | No Change | Modify Key R1->R1' | R1->R1' | R1->R1' |
| 9 | Create R1 | Create R1 | R1+ | R1+ |
| 10 | Create R1 | Create R1' | R1+, R1'+ | R1+, R1'+ |
| 11 | Modify R1->R1' | Modify R1->R1' | R1->R1' | R1->R1' |
| 12 | Modify R1->R1' | Modify R1->R1" | R1->R1', R1"+ | R1->R1", R1'+ |
| 13 | Modify R1->R1' | Delete R1 | R1->R1' | R1-, R1'+ |
| 14 | Modify Key R1->R2 | Create R2 | R1-, R2+ | R1-, R2+ |
| 15 | Modify Key R1->R2 | Modify R1->R2 | R1-, R2+, R1'+ | R1-, R1'+, R2+ |
| 16 | Modify Key R1->R2 | Modify Key R1->R2 | R1-, R2+ | R1-, R2+ |
| 17 | Modify Key R1->R2 | Modify Key R1->R3 | R1-, R2+, R3+ | R1-, R2, R3, R2+ |
| 18 | Modify Key R1->R2 | Delete R1 | R1-, R2+ | R1-, R2+ |
| 19 | Delete R1 | Modify R1->R1' | R1-, R1'+ | R1->R1' |
| 20 | Delete R1 | Delete R1 | R1- | R1- |

| Case # | MBO Change | MB1 Change | MBO Result | MB1 Result |
|---|---|---|---|---|
| 21 | Create RR1 | No Change | RR1+ | (RR1+) |
| 22 | Modify RR1->RR1' | No Change | RR1->RR1' | (RR1->RR1') |
| 23 | Delete RR1 | No Change | RR1- | (RR1-) |
| 24 | Modify Key RR1->RR1' | No Change | RR1->RR1' | (RR1-, RR1'+) |
| 25 | No Change | Create RR1 | (RR1+) | RR1+ |
| 26 | No Change | Modify RR1->RR1' | (RR1->RR1') | RR1->RR1' |
| 27 | No Change | Delete RR1 | (RR1-) | RR1- |
| 28 | No Change | Modify Key RR1->RR1' | (RR1->RR1') | RR1->RR1' |
| 29 | Create RR1 | Create RR1 | RR1+ | RR1+ |
| 30 | Create RR1 | Create RR1' | RR1+, (RR1'+) | (RR1+), RR1'+ |
| 31 | Create RR1 | Modify RR2->RR2' | RR1+, (RR2->RR2') | (RR1+), RR2->RR1 |
| 32 | Create RR1 | Delete RR2 | RR1+, (RR2-) | (RR1+), RR2->RR1 |
| 33 | Create RR1 | Modify Key RR2->R3 | RR1+, (RR2->R3) | (RR1+), RR2->R3 |
| 34 | *Create RR1* | *Delete RR2* | *RR1+, RR2-* | *(RR1+), RR2-* |
| 35 | Modify RR1->RR1' | Modify RR1->RR1' | RR1->RR1' | RR1->RR1' |
| 36 | Modify RR1->RR1' | Modify RR1->RR1" | RR1->RR1', (RR1"+) | RR1->RR1", (RR1'+) |
| 37 | Modify RR1->RR1' | Modify RR2->RR1 | RR1->RR1' | RR2->RR1 |
| 38 | Modify RR1->RR1' | Modify RR2->RR2' | RR1->RR1', (RR2->RR2') | RR2->RR2', RR1->RR1' |
| 39 | Modify RR1->RR1' | Modify Key RR1->R3 | RR1->RR1', R3+ | RR1->R3, RR1'+ |
| 40 | Modify RR1->RR1' | Create RR1' | RR1->RR1' | RR1'+ |
| 41 | *Modify RR1->RR1'* | *Create RR2* | *RR1->RR1', RR2+* | *(RR1->RR1'), RR2+* |
| 42 | Modify RR1->RR1' | Delete RR1 | RR1->RR1' | (RR1->RR1') |
| 43 | *Modify RR1->RR1'* | *Delete RR2* | *RR1->RR1', RR2-* | *(RR1->RR1'), RR2-* |
| 44 | Modify Key RR2->R3 | Create R3 | RR2->R3+ | R3+, RR2-> |
| 45 | Modify Key RR2->R3 | Modify Key RR1->R3 | RR1->R3, RR2- | RR2->R3 |
| 46 | Modify Key RR2->R3 | Modify Key RR2->R4 | RR2-, R3+, (R4+) | RR2->R4, (R3+) |
| 47 | Modify Key RR2->R3 | Modify RR2->RR2' | RR2-, R3+, (RR2'+) | RR2->RR2', (R3+) |
| 48 | Modify Key RR2->R3 | Delete RR2 | RR2-, R3+ | RR2-, (R3+) |
| 49 | *Delete RR1* | *Create RR2* | *RR1-, RR2+* | *(RR1-), RR2+* |
| 50 | Delete RR1 | Modify RR1->RR1' | RR1-, (RR1'+) | RR1->RR1' |
| 51 | Delete RR1 | Modify Key RR1->R3 | RR1-, (R3+) | RR1->R3 |
| 52 | Delete RR1 | Delete RR1 | RR1- | RR1- |
| 53 | Delete RR1 | Delete RR2 | RR1-, (RR2-) | (RR1-), RR2- |

APPLICATION INDEPENDENT E-MAIL SYNCHRONIZATION

RELATED ART

This application is a continuation in part under 37 CFR 1.53 of prior filed pending application Ser. No. 08/431,500 entitled APPLICATION INDEPENDENT RECORD LEVEL SYNCHRONIZATION is now allowed.

BACKGROUND OF THE INVENTION

(1) Field of the Invention

The invention relates to synchronization of data, more particularly, to the method and apparatus for application independent e-mail synchronization.

(2) Background

Synchronization is a process by which two or more different sets of data from one or more different applications are made semantically equivalent. Semantically equivalent mail boxes in an E-mail (electronic mail) system contain the same information even though they may represent the information differently in digital storage. For example, the time "8:00 am" may be encoded by an E-mail system as an integer representing the number of minutes since midnight, and another e-mail system may encode the same information as a string. For example, the time 8:00 am may be represented as the letter '8' followed by ':', '0', and '0'. Synchronization is only meaningful for use with sets of data with semantic equivalence, i.e. two different representations of essentially the same, or a subset of the same information.

For example, it does not make sense to synchronize data in a phone book with data in a to-do list.

There are no synchronization techniques available today for mail tools such as Lotus CC: mail. There are several PC applications which implement synchronization. A typical implementation uses time stamps which a computer's file system attaches to each file to determine which files are new or have been modified. The older files are overwritten with the newer files by the same name.

FIG. 1 is a table 10 illustrating two possible results produced by using the prior art technique of file synchronization on two mail boxes MB0 and MB1. At time T0, mail box MB0 has four messages A, B, C and D. MB1 also has messages A, B, C and D. At time T1, MB0 and MB1 are independently modified. Intermediate MB0' now has messages E, B, C and D, with message A modified to E. Intermediate MB1' has messages A, B, C and F, with message D modified to F. Mail box synchronization overwrites one mail box in order to "synchronize" the mail boxes which have been modified. Thus at Time T2, after a mail box synchronization, the resulting mail boxes MB0" and MB1" have messages E, B, C and D if mail box MB1' is overwritten by the contents of mail box MB0'. In the alternative, a resulting synchronized mail box may have messages A, B, C and F, if MB0' is overwritten by the contents of MB1'. Neither results are completely correct since the first result does not reflect the change of message D to F, and the second result does not reflect the change of message A to E.

Mail box level synchronization's usefulness is severely limited as illustrated in FIG. 1. First of all, since the contents of the one mail box is replaced or overwritten by the other by its copy, the two mail boxes being synchronized must have the same format. This typically means they must be produced by the same application. Secondly, if both versions of the mail boxes have been changed independently of one another, as illustrated in the previous example in FIG. 1, one set of changes will overwrite the other, leading to data loss in synchronization. These limitations of mail box level synchronization are well understood by those skilled in the art.

Of the handful of applications which do offer synchronization, most can synchronize only data created by the same application, and a few with data from at most one or two other applications. An example is MS Mail.

Thus it is desirable to have a method and an apparatus for implementing synchronization for a mail system which do not require changing existing applications or establishing new application inter-operability standards, and for implementing synchronization of data between applications with different data formats.

BRIEF SUMMARY OF THE INVENTION

An apparatus for synchronization of a first set of mail with a second set of mail at a mail message or a folder level comprising a memory for containing, a pseudo unique identification generator for generating an identification for each mail message or folder, an event log generator for generating an event for an event log for each mail message or folder with the identification, a synchronization mechanism for making the first set of mail and the second set of mail equivalent and a processor for running the event log generator, the pseudo unique identification generator and the synchronization mechanism.

BRIEF DESCRIPTION OF THE DRAWINGS

FIG. 1 illustrates synchronization results using a prior art method of file level synchronization.

FIG. 2 illustrates synchronization results using the method and apparatus of the present invention.

FIG. 4b is a flow diagram illustrating the general steps followed by the apparatus illustrated in FIG. 4a.

FIG. 4c illustrates exemplary data structures for exemplary Change Lists CL0 and CL1.

FIG. 7c illustrates an exemplary data structure modified by the steps described in FIG. 7a.

FIG. 12 is a table illustrating the mail synchronization method of the present invention.

FIG. 13 is a table illustrating exemplary mail synchronization scenarios where there are mail messages or folders with the same Key Attribute values.

DETAILED DESCRIPTION OF THE INVENTION

Figure 3A:
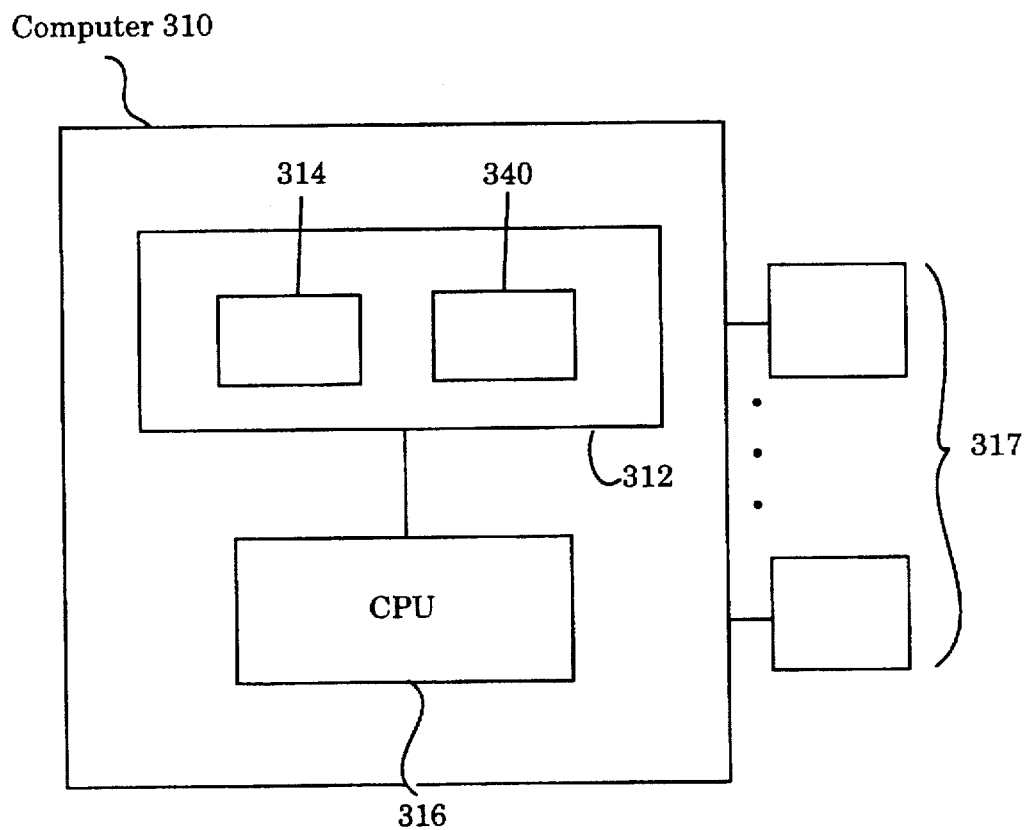
FIG. 3a illustrates an exemplary system block diagram of the present invention.

The present invention allows data in e-mail systems to be synchronized at a message or folder level (as opposed to a mail box level) with semantically equivalent data from any set of e-mail systems. A mail message is defined as a message body and a set of attributes. A message body consists of one or more attachments. The attachments maybe in different formats, such as in ASCII, MIME (Multiple Internet Mail Extensions) or MS Word. Some of the frequently used attributes are the reception time, sender, recipient, folder name and size attributes. Mail messages are grouped into folders. A folder is defined as a name and a list of id's (identifications) of messages in the folder. A folder operation applies to all messages in the folder. For example, deleting a folder will delete all the messages in that folder. Typically, all attributes are immutable except the name attribute. Thus the user can not fabricate a mail message.

There are several operations in a mail system. One operation is the new operation which is performed when a user copies a mail message or folder or a new message arrives. An update operation updates the attribute of a message or a folder. A delete operation deletes a message or a folder.

Synchronization as referred herein takes as input two different sets of data where those two sets of data become equivalent subsequent to the synchronization process. Equivalent herein refers to messages or folders which are semantically the same but which may not be represented the same. For example, a message or folder with information indicating an 8:00 am appointment with Bob stored in two different e-mail systems has the same semantics independent of how the data is represented digitally by each of the e-mail systems. Given two e-mail systems to be synchronized, the method and apparatus of the present invention allows the synchronization process to be performed efficiently and more accurately than prior art methods.

FIG. 2 is a table 20 illustrating the synchronization of two mail boxes MB0 and MB1 using message level synchronization of the present invention. At time T0, mail box MB0 has messages A, B, C and D. Mail box MB1 has messages A, B, C and D. At intermediate time T1, MB0 and MB1 have been independently modified, resulting in intermediate MB0' and MB1'. Intermediate MB0' has messages E, B, C and D, with message A modified to E. Intermediate MB1' has messages A, B, C and F, with message D modified to F. At time T2 after a message level synchronization, the synchronized MB0" and MB1" have messages E, B, C and F, reflecting the modification of both messages A to E as well as messages D to F.

An iterative process of synchronization of two mail boxes may be illustrated with a simple example. Referring back to the illustration in FIG. 2, given sequential time units T0, T1 and T2 and additional time units T3 and T4 and mail boxes MB0 and MB1, if synchronization is performed at the end of time T1, mail boxes MB0 and MB1 are equivalent at T2. The synchronized mail boxes of MB0 and MB1 are referred to here as MB0" and MB1" as was done in the illustration of FIG. 2. Mail boxes MB0" and MB1" may then be independently modified at T3, either by one or multiple users and/or applications. Upon modification, mail boxes MB0" and MB1" become MB1'" and MB2'". At time T4, synchronization is run with MB1'" and MB2'" as input, outputting MB1"" and MB2"". At time T4, MB1"" and MB2"" are again equivalent data sets.

Although this synchronization process is illustrated with only two mail boxes to synchronize, namely exemplary mail boxes MB0 and MB1, the present invention can easily be extended to synchronize more than two data sets. For more than two data sets, synchronization can be applied to pairs of mail boxes until all sets are equivalent. For instance, given four mail boxes MB1', MB2', MB3', and MB4', each mail box may be synchronized in turn with every other data set. That is, MB1' is synchronized in turn with MB2', MB3', and MB4', then MB2' is synchronized with MB1', MB3' and MB4', etc. A more efficient implementation would run the Change Detection Method outlined in this invention on each of the data sets, and then merge the Change Lists (CL1, CL2, CL3, CL4). Thus, the present invention's method and apparatus for a two way synchronization also provides synchronization among any number of mail boxes.

FIG. 3a illustrates an exemplary system block diagram of the present invention. Computer 310 has memory 312 coupled to CPU 316. Memory 312 has mail synchronization 330, event log 333 and Change List 314. Further, computer 310 may have various peripheral devices 317 such as a keyboard and/or a display device.

Figure 3B:
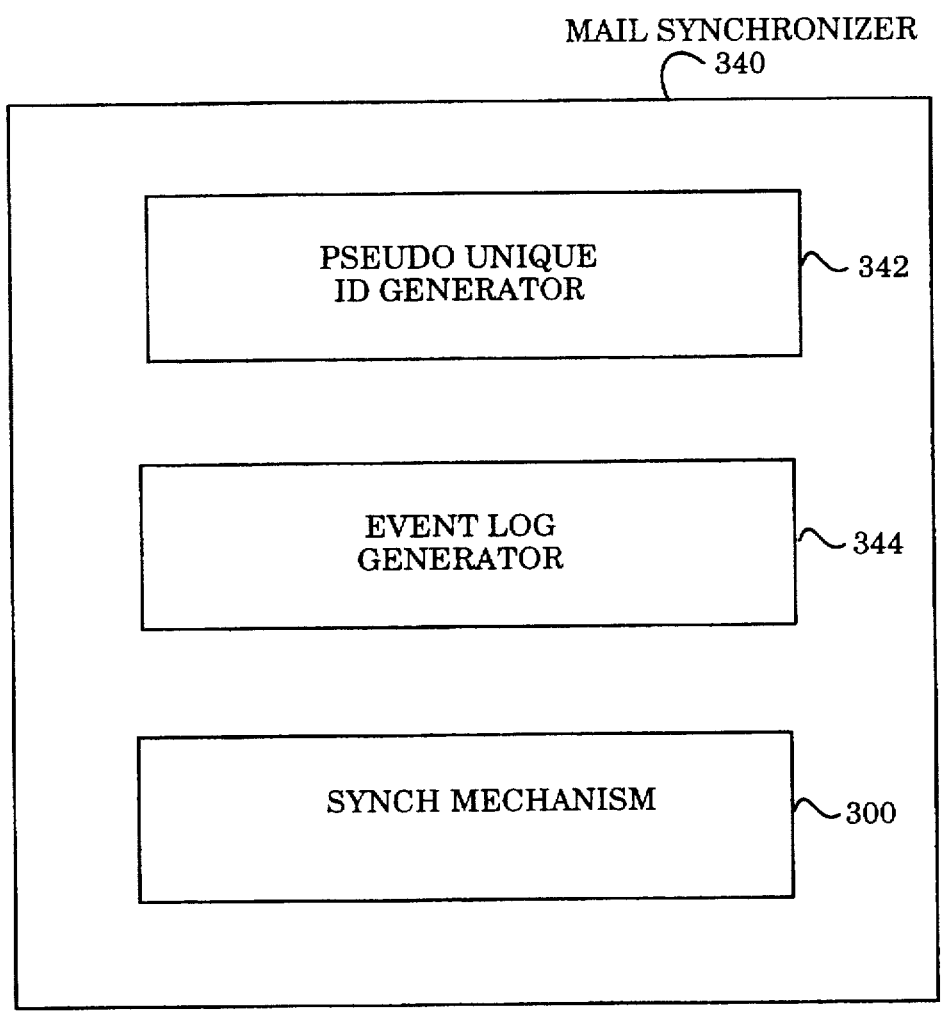
FIG. 3b illustrates an exemplary block diagram of the mail synchronizer of the present invention.

FIG. 3b is a block diagram illustrating the present invention. Mail synchronizer 340 for synchronizing changes made independently on an e-mail system on two separate computers or two different e-mail systems on the same computer. Pseudo unique ID generator 342 generates a pseudo unique ID for each mail or folder in a mail box for an e-mail system. Event log generator 344 generates an event log by generating events for each ID (i.e. for each mail or folder). Synch mechanism synchronizes the mail boxes using the generated event logs.

Figure 3C:
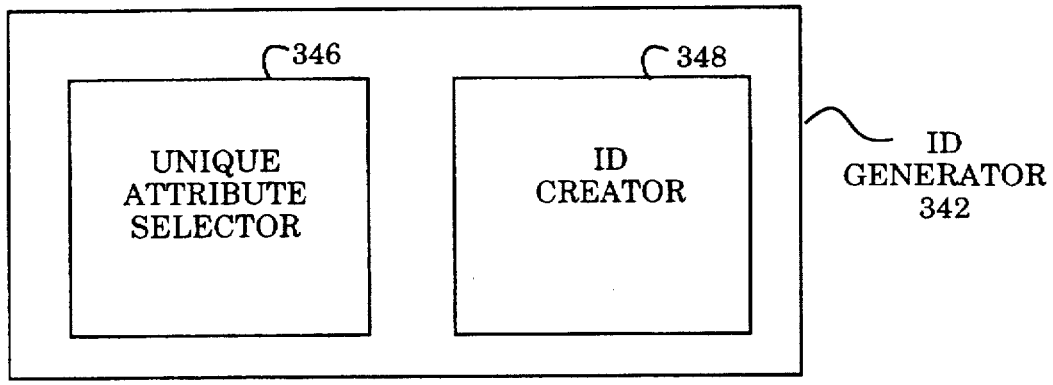
FIG. 3c illustrates a block diagram of the ID generator illustrated in FIG. 3b.

FIG. 3c illustrates a block diagram of the ID generator illustrated in FIG. 3b. ID generator 342 has unique attribute selector 346 and ID creator 348. Unique attribute selector 346 selects an attribute that is most likely to be unique given a mail or a folder. ID creator 348 generates an ID for each mail or folder in a mail box.

Figure 3D:
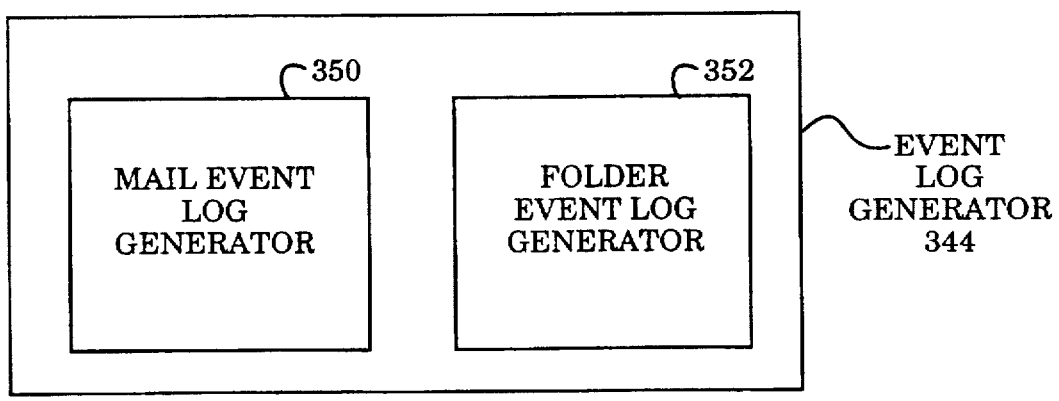
FIG. 3d is a block diagram of the event log generator illustrated in FIG. 3b.

FIG. 3d is a block diagram of the event log generator illustrated in FIG. 3b. Event log generator 344 has mail event log generator 350 and folder event log generator 352. Mail event log generator 350 generates an event for the event log for each mail in mail boxes to be synchronized. Folder event log generator 352 generates an event for the event log for each folder in the mail boxes to be synchronized.

Figure 3E:
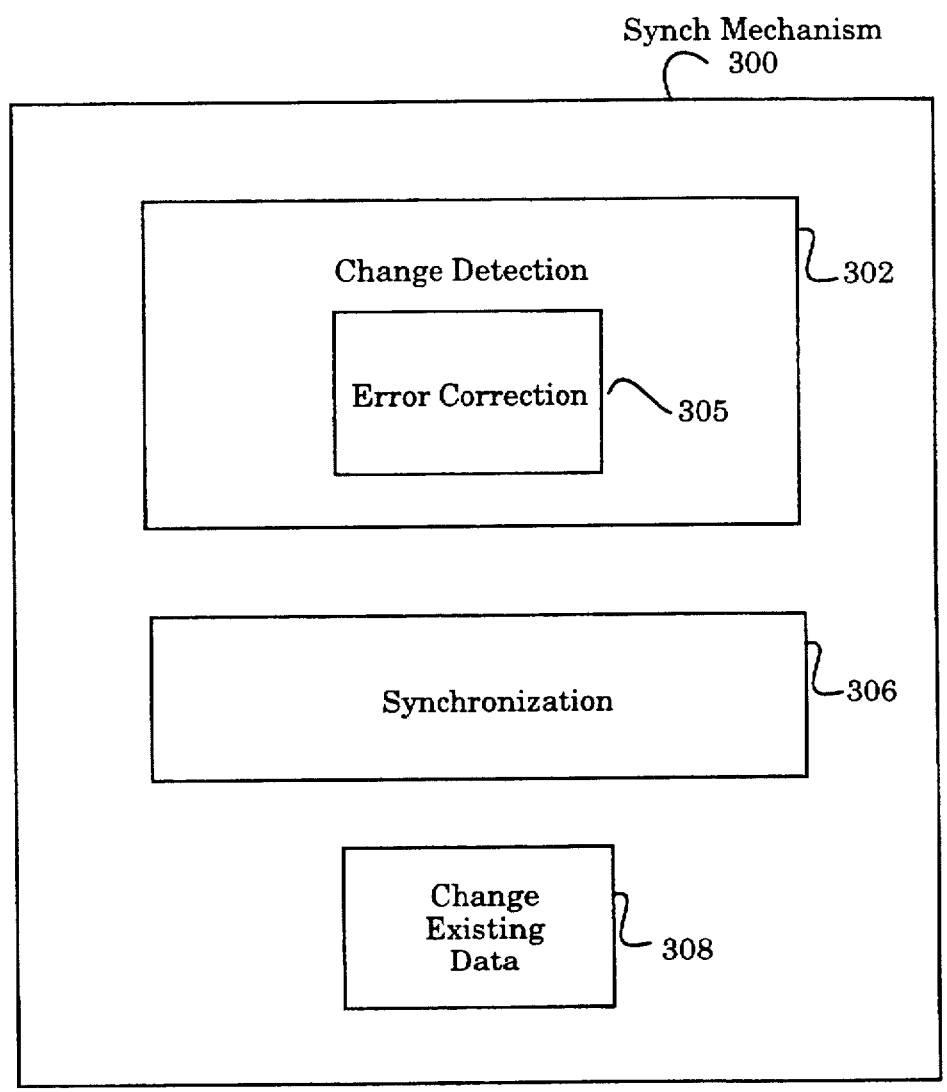
FIG. 3e is an exemplary block diagram of the synch mechanism of the present invention.

FIG. 3e is a block diagram of the synch mechanism of the present invention illustrated in FIG. 3b. Synch mechanism 300 has sub-parts, Change Detection mechanism 302, Error Detection mechanism 305, Change Existing Data mechanism 308 and Synchronization mechanism 306. Change Detection mechanism 302 detects the changes which have occurred to a given mail box since the last synchronization. Error Detection 305 identifies incorrect updates and creates performed by Change Detection mechanism 302. Error conditions triggering Error Detection 305 include when a record's Key Attribute has changed in MB0' and/or when more than one message/folder is sharing the same Key Attribute values (an example of a non-unique identifier case is described in more detail below). Synchronization mechanism 306, performs the synchronization of data sets, given information regarding the mail boxes produced by Change Detection mechanism 302. Change Existing Data 308 modifies existing data to make the mail boxes equivalent.

Figure 4A:
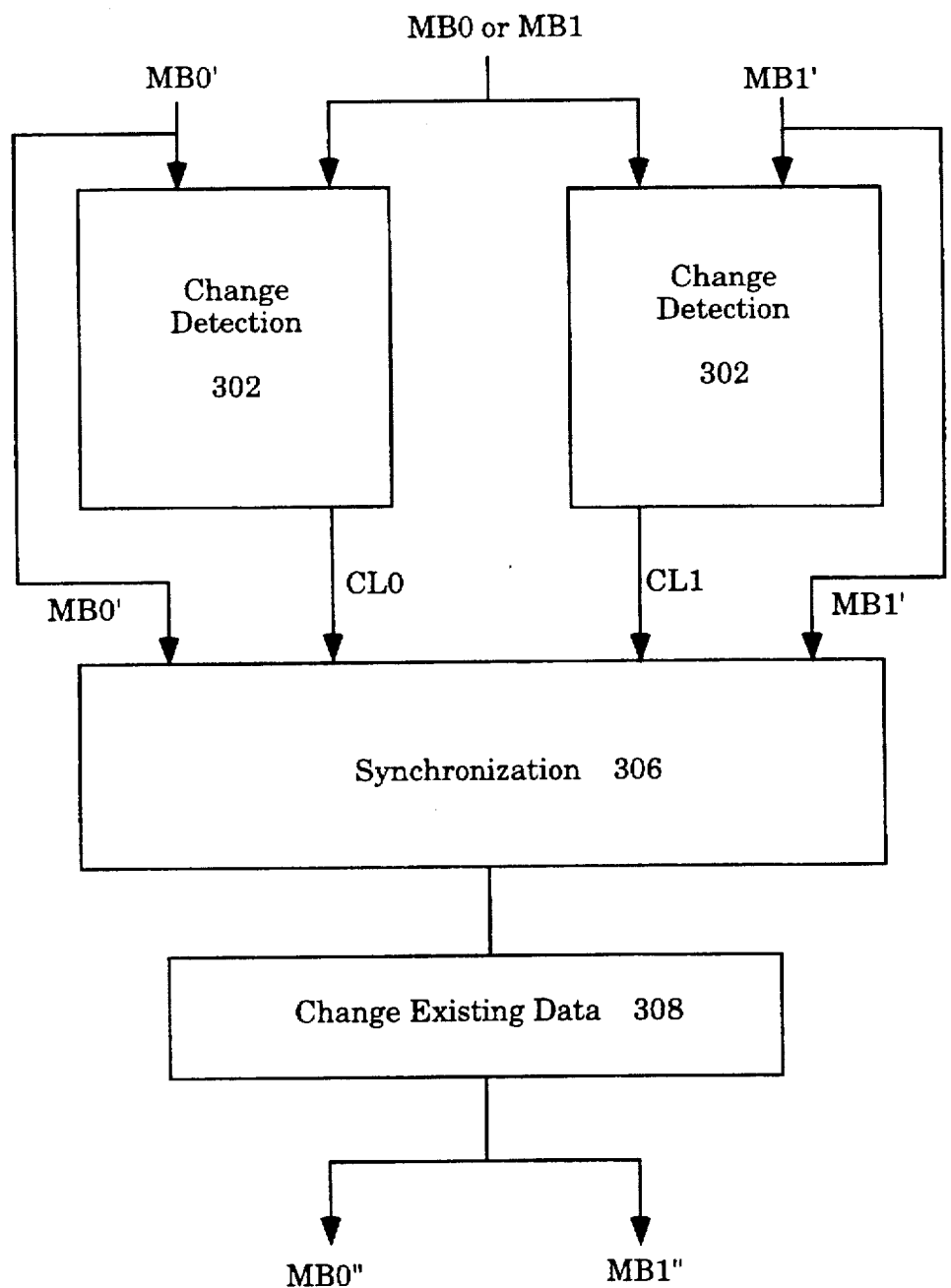
FIG. 4a is a block diagram illustrating an exemplary synchronization apparatus of the present invention.

FIG. 4a illustrates an exemplary synch mechanism apparatus of the present invention. The apparatus has Change Detection mechanism 302 with inputs of mail boxes MB0', MB1' and MB0 or MB1. Change Detection mechanism 302 produces Change List CL0 for MB0 and MB0' and Change List CL1 for MB1 and MB1'. A Change List (CL) is a list of mail message or folder level changes for a given mail box (described in more detail in the description accompanying FIG. 4c below). Synchronization mechanism 306 is fed inputs MB0', MB1' and newly produced Change Lists CL0 and CL1. The output of Synchronization mechanism 306 is input to Change Existing Data 308 to produce synchronized mail boxes MB0" and MB1".

Figure 4B:
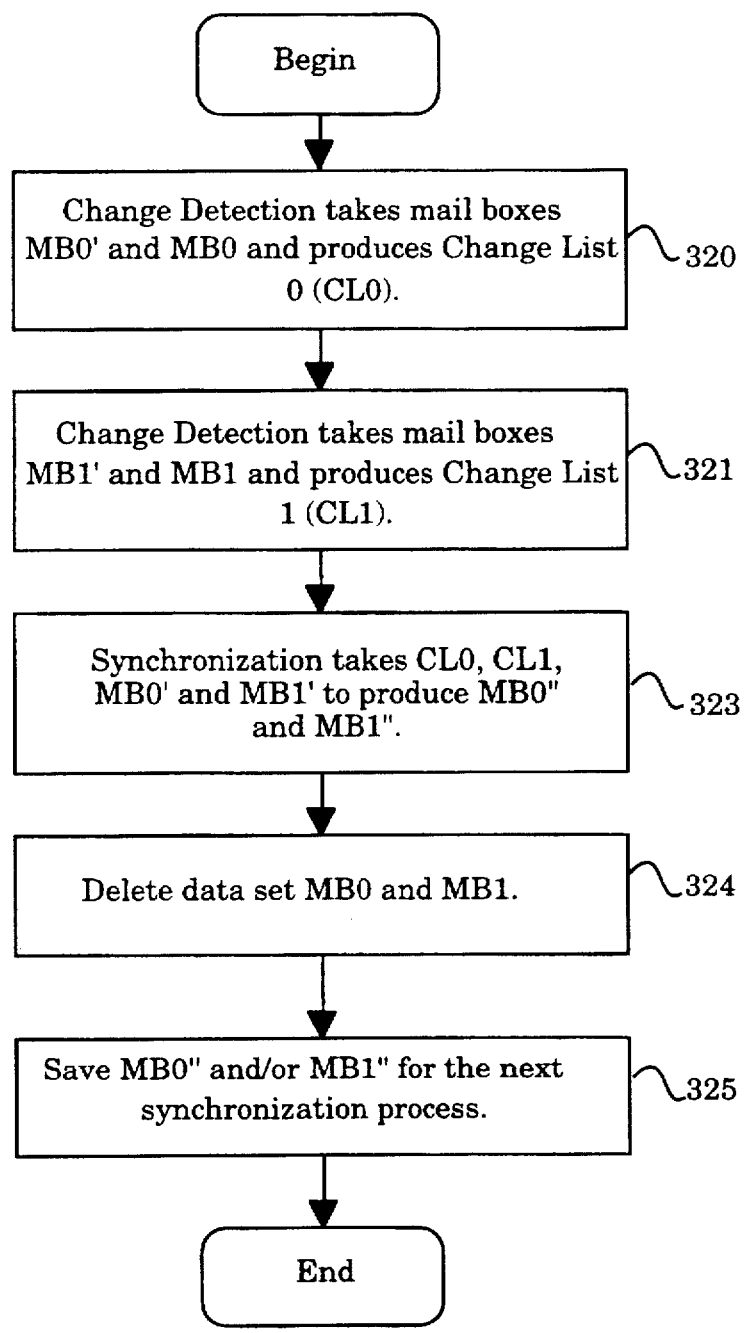

FIG. 4b is a flow diagram illustrating the general steps followed by the synch mechanism apparatus of the present invention referenced in FIG. 4a. In step 320, mail boxes MB0, MB1, MB0' and MB1' are input to Change Detection mechanism 302. Mail boxes MB0 and MB1 are equivalent and may be the same file or non existent. MB0' and MB1' are a version of MB0 and MB1 after they have been independently modified. They are saved when synchronization was last run (i.e. when the last time steps 320 through 325 were performed). Change Detection mechanism 302 determines the changes which have been made to mail boxes MB0' and MB0 between synchronizations to produce Change List CL0. In step 321, Change Detection mechanism 302 performs the same operation to produce Change List CL1 from mail boxes MB1' and MB1. In step 323, Synchronization mechanism 306 takes as input, CL0, CL1, MB0' and MB1'. The result of Synchronization mechanism 306 is input to Change Existing Data 308 to produce synchronized mail boxes MB0" and MB1". In step 324, original mail boxes MB0 and MB1 are deleted. In step 325, MB0" and/or MB1" are saved as MB0 and MB1 for the next synchronization process.

FIG. 4c illustrates exemplary data structures for Change Lists CL0 and CL1. In an exemplary data structure for CL0, column 330 contains the original mail messages or folders from mail box MB0. Only the mail messages or folders which have been updated or deleted are listed in this column. Column 331 contains the status of the mail message or folder of the corresponding row and indicates whether the corresponding mail message or folder has been updated or deleted. An entry is also made for mail messages or folders which have been newly created.

For those mail messages or folders which have been created or updated, a corresponding new mail message or folder in mail box MB0' produced as a result of the update or create is listed in column 332. Thus, a mail message or folder Rm from MB0 which has been updated produces an updated mail message or folder Rm' in mail box MB0' in column 332. Deleted mail message or folder Rp from MB0 is not present in MB0' as illustrated by the corresponding blank entry in column 332. Newly created mail message or folder Ru is listed as a new message/folder in mail box MB0' in column 332.

Finally, column 333 indicates whether the synchronization has taken place. The entries for this column initially indicates "no" for corresponding mail messages or folders which have not been processed by Synchronization mechanism 306 (see FIGS. 9a–9e for the general steps followed by Synchronization mechanism 306). After processing by Synchronization mechanism 306, the column entries are changed to "yes" to indicate that the corresponding mail message or folder has been synchronized.

The exemplary data structure illustrated for CL1 has columns 334 through 335 and has the same structure as was described for CL0, with the exception of an event Received in column 335 for messages. This event is particular to messages and does not apply to folders.

In the exemplary Change List (CL) described above, mail messages or folders may be marked as Created, Updated, Deleted, Received (for messages) or Created_Deleted. The Change List lists the changes made to a mail box (e.g. MB0) to produce a modified mail box (e.g. MB0'). Thus if a mail message or folder in MB0 was Deleted or Updated, the change is reflected in CL0, the Change List showing the differences between MB0 and MB0'. If a new mail message or folder not in MB0 was Created in MB0', this is reflected in CL0 as well.

Although a combination of the operations, Created, Updated and Deleted, may be applied to a record, only the end result at the time of the next synchronization is relevant for the Change List. This may be illustrated with an exemplary mail box MB0'. Mail box MB0' contains the final form of each mail message or folder before the next synchronization and is a mail box containing all the changes made to an original mail box MB0. If a mail message or folder Ru was created in MB0', then modified, the correct change appearing on the Change List CL0 for MB0 and MB0' is Created since the original version of the mail box MB0 did not contain Ru. Thus, even if Ru was modified after creation in mail box MB0', for the purposes of listing the changes made between the original mail box MB0 and the modified version MB0', the difference represented in the list is that a new mail message or folder Ru was created.

If a mail message or folder was created in MB0' and then deleted (Created_Deleted case), the mail message or folder should not appear in the Change List at all, if the Change List is generated retroactively. In the same fashion, if a mail message or folder was modified and then deleted mail, the message or folder should appear in the Change List as Deleted. Change Detection method 302 generates correct answers for all of these cases, as well as any combination of the above.

Figure 5A:
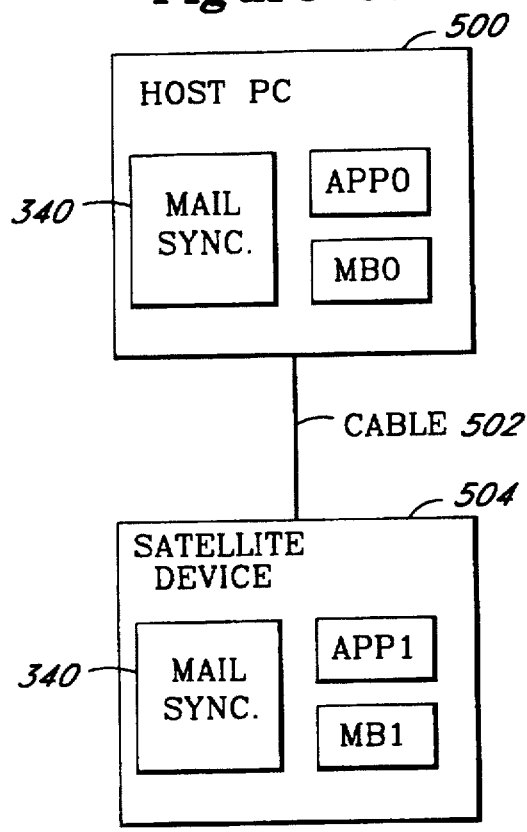
FIGS. 5a–5c are alternate embodiments of a system block diagram illustrating the mail synchronization method and apparatus of the present invention.
Figure 5B:
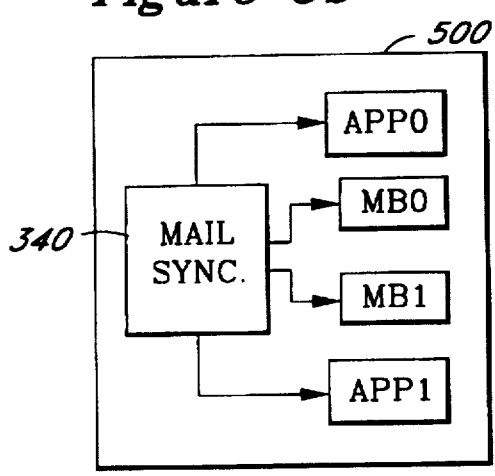
Figure 5C:
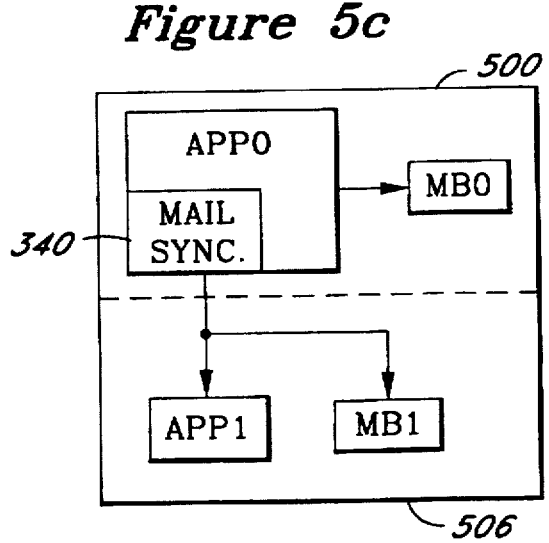

FIGS. 5a–5c are exemplary embodiments of a system block diagram with the implementation of the E-mail synchronization method and apparatus of the present invention. The present invention may be used to synchronize mail messages or folders between mail boxes MB0 and MB1, belonging to application app0 and application app1 respectively. A variety of configurations are possible. For example, MB0 may reside in a satellite device (e.g. a notebook or a hand held computer, such as an Apple® Newton, a Sharp® Wizard, or a Casio® BOSS) and MB1 may reside on a host computer (e.g. a desktop or a notebook PC) as illustrated in FIG. 5a. Further, MB0 and MB1 may reside on the same system as illustrated in FIG. 5b. MB0 and MB1 may also reside on two different PC's linked by a computer network as illustrated in FIG. 5c. In addition, app0 and app1 may be the same application. The present invention may be implemented for synchronization of any two or more mail boxes and is not limited to the exemplary configurations illustrated herein.

More specifically, FIG. 5a illustrates an embodiment of the present invention where neither app0 nor app1 generates a Change List (CL). Host PC 500 is coupled to satellite device 504 via cable 502. Mail synchronizer 340 may reside on either host PC 500 or satellite device 504 or on both.

In an alternative embodiment, one of the applications, app0 or app1, may support synchronization by generating a Change List (CL). In this embodiment, the flow diagram in FIG. 4b may be changed such that a Change List for MB0' from app0 is retrieved at step 500.

FIG. 5b illustrates an embodiment where mail synchronizer 340 is implemented as an application residing on PC 500 separate from the applications/e-mail systems being synchronized. This allows users to synchronize data between existing installed applications without having to buy new versions of their applications. Further, users do not have to wait for application vendors to add synchronization support to their applications. The only requirement for this embodiment is that the applications being synchronized provide a means for a third party apparatus to import and export data to and from their native data formats.

Examples of such means include but is not limited to: published file format, application programming interface (API), specialized interface such as Standard Query Language (SQL) used by databases, Dynamic Data Exchange (DDE), or some communication protocol for transferring information to and from a mobile or remote device. The details on how to implement the importation and exportation of data to and from an application using published formats are application specific and well understood by those skilled in the art.

In an alternative embodiment illustrated in FIG. 5c, mail synchronizer 340 is implemented as part of one of the applications residing on PC 500 and involved in the synchronization. The only requirement here is that app1 (residing on PC 506) with which app0 (residing on PC 500) is to be synchronized must provide a means for a third party apparatus to import and export data to and from their native formats.

In yet another alternate embodiment, mail synchronizer 340 may be implemented as part of both app0 and app1, and a predefined communication protocol is used to exchange information such as for a Change List. Other embodiments are possible and are included in the scope of this invention. For these alternative embodiments, the apparatus and methods of the present invention are unchanged, and the only difference is in how the apparatus is packaged. Given the present invention, how the apparatus may be packaged will be readily understood by a person skilled in the art.

Figure 5D:
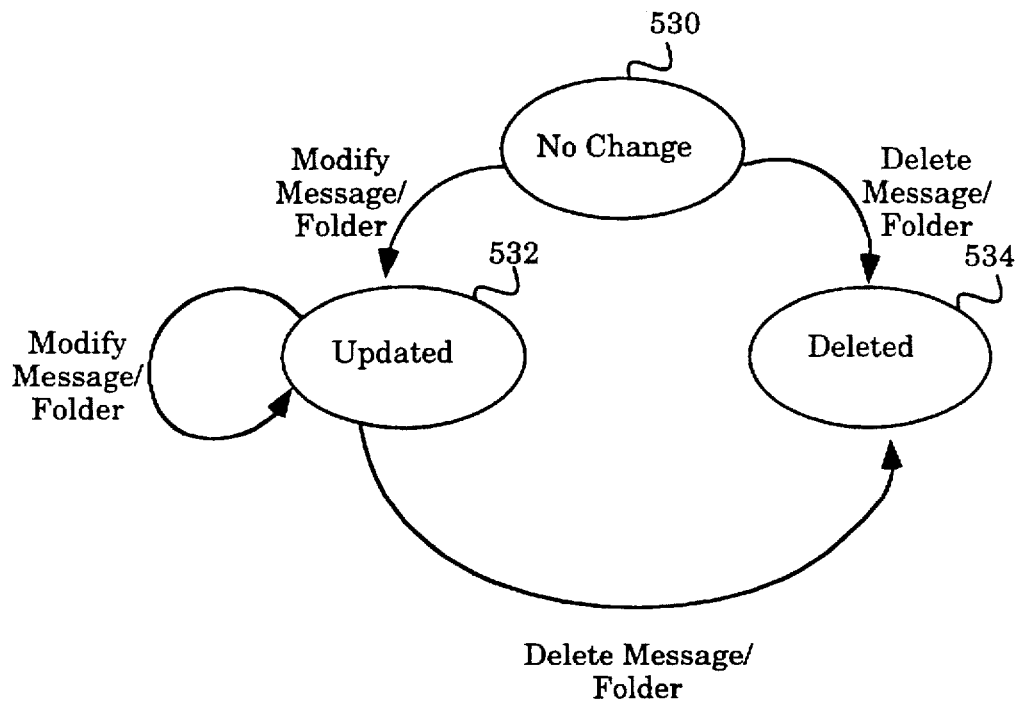
FIGS. 5d and 5e are state transition diagrams illustrating how a change log is truncated to result in exactly one change flag marked for each mail message or folder.
Figure 5E:
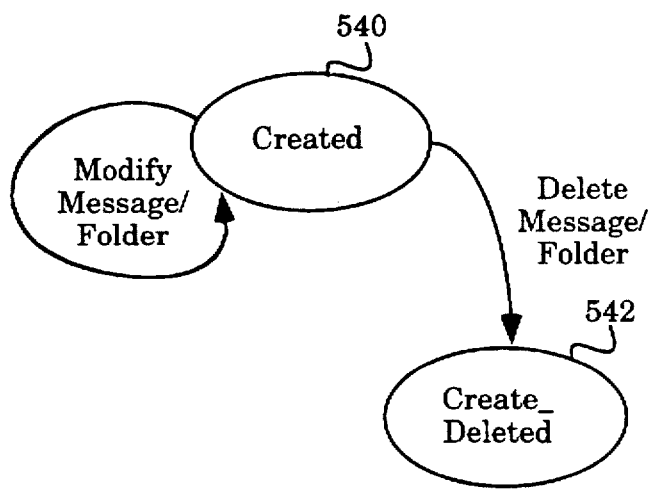

Since the synchronization method of this invention is only concerned with the end resulting difference between MB0' and MB0, rather than the history of all changes that might have happened, a synchronization aware application (such as App1 in FIG. 5c) need not keep a traditional log of all activities for each record. Instead, it is safe to truncate the log such that only the most recent relevant changes are kept. The state transition diagrams in FIGS. 5d and 5e illustrate how the log or more specifically, a Change List as referred to herein, can be truncated such that there is exactly one change flag marked for each record. Truncating the Change List is desirable because it reduces the amount of storage required for the Change List. This is particularly important for memory limited devices, such as hand held computers.

In FIG. 5d, after synchronization at state 530, all mail messages or folders are marked "No Change." A "No Change" mail message or folder may transition to either "Updated" or "Deleted." In state 532, an "Updated" mail message or folder stays "Updated" unless it becomes "Deleted". In state 534, a "Deleted" mail message or folder always remains "Deleted."

In FIG. 5e, a newly created mail message or folder is marked "Created" as illustrated in state 540 and remains "Created" unless it is later deleted. If a "Created" mail message or folder is deleted, it is marked "Created_Deleted" in state 542. Even if a new mail message or folder is later modified, it is still marked "Created" for synchronization purposes.

Created_Deleted mail messages or folders are transient and are always ignored during synchronization.

Figure 6A:
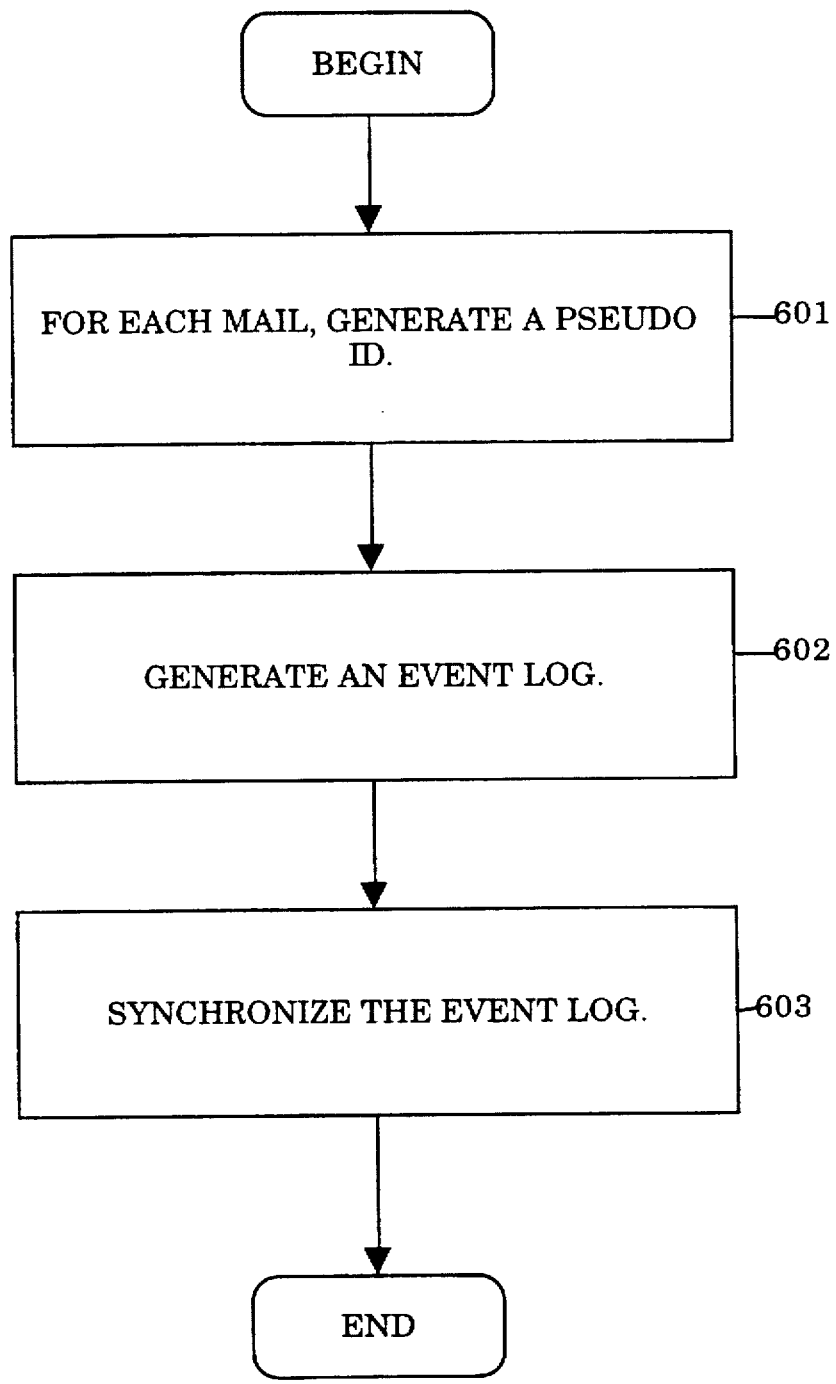
FIG. 6a illustrates the general steps followed by the mail synchronizer of the present invention.

FIG. 6a illustrates the general steps followed by the e-mail synchronizer of the present invention. In step 601, for each mail, a pseudo ID is generated. More detailed description and steps followed by this portion is described in FIG. 6b in the accompanying text. In step 602, once a pseudo ID is generated for each mail, an event log is generated per each mail box. A more detailed description is provided in FIGS. 6c, 6d, 6e and 6f in the accompanying text. Once event logs are generated, they are synchronized in step 603. A more detailed description is provided in FIGS. 9a through 9e.

Figure 6B:
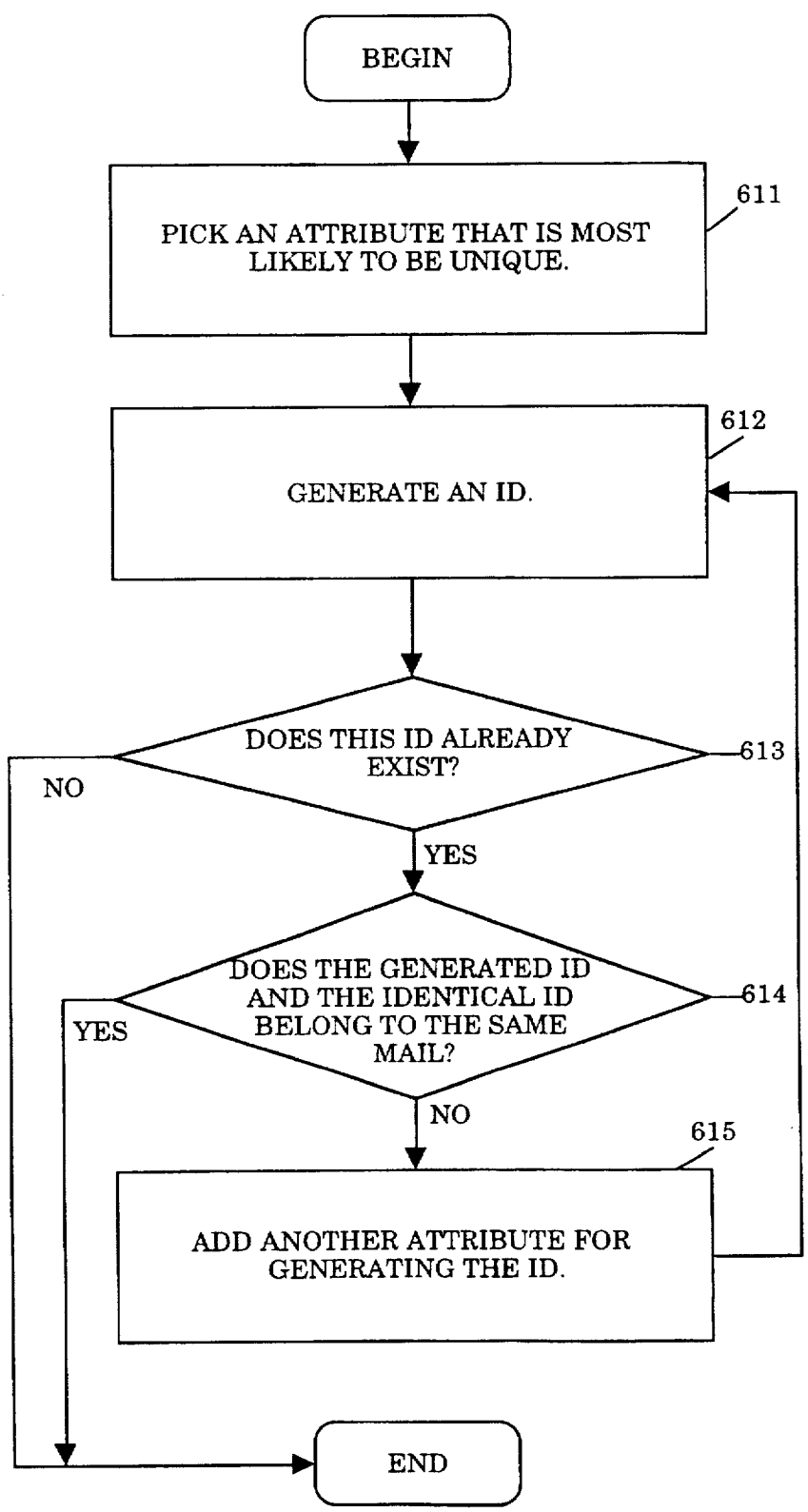
FIG. 6b describes the general steps followed by the present invention in generating a pseudo unique ID for each mail message or folder in a mail box to be synchronized with another mail box.

FIG. 6b describes the general steps followed by the present invention in generating a pseudo unique ID for each mail in a mail box to be synchronized with another mail box. In step 611, an attribute in each mail which is most likely to be unique is selected. An example of such an attribute is the mail message reception time. In step 612, an ID is generated from the selected attributes for each mail. For example, in a typical mail system such as Lotus CC: mail, a message has the following attributes: message type, folder name, sender, recipient, subject, receiving time, priority, receipt request, and size. The receiving time may be selected first for generating a pseudo unique id. The attributes may be selected in the following order if the receiving time is not unique: sender, subject, size, recipient, folder name, message type, priority and receipt request.

In step 613, if this ID already exists, it is determined whether or not the generated ID and the identical ID belong to the same mail in step 614. If the generated ID and the identical ID do not belong to the same mail, then in step 615, another attribute is added to the mail in order to generate another ID. Back in step 612, another ID is then generated and the process is repeated until each mail in the mail box has a pseudo unique ID.

Although the above process does not guarantee to generate a unique id for each mail message or folder, the process will not destroy the synchronization process. If a user copies a message to the same folder, this will produce two identical messages. Because all their attributes are the same, the two messages will have the same id. For any operation such as delete, update or new (copy) operation performed on any one of these identical messages, the operation may be applied to any other message having the same id at the synchronization site. Because the operations are performed to messages having the same identical attributes, the result is the same. After a delete or an update operation. every message becomes unique because the duplicated messages are deleted by the delete operation and the update operation causes identical messages (which have not been deleted) to have different attribute values through the updated attributes.

Figure 6C:
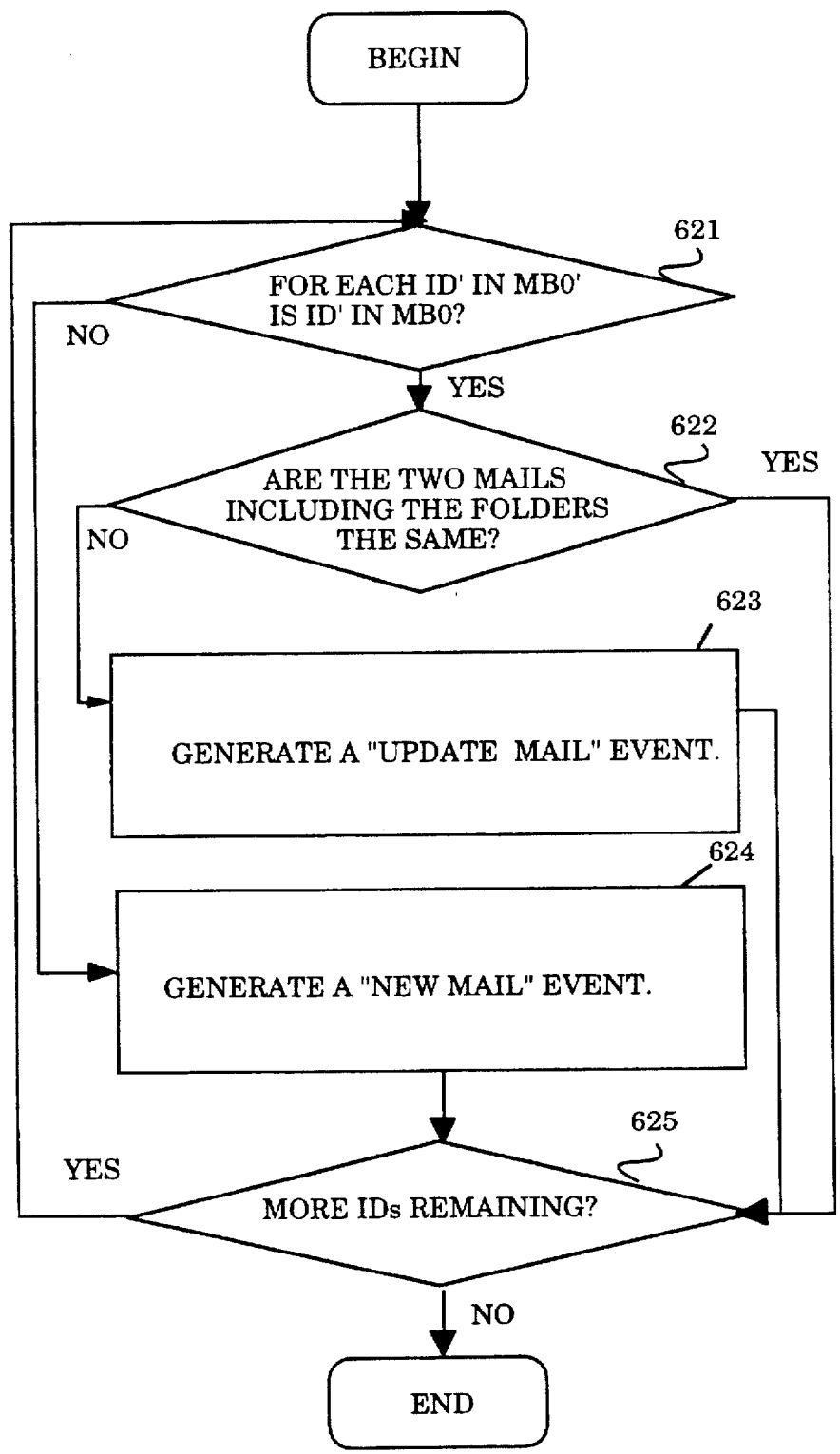
FIGS. 6c and 6d describe the general steps followed by the present invention in generating an event log for a mail message.
Figure 6D:
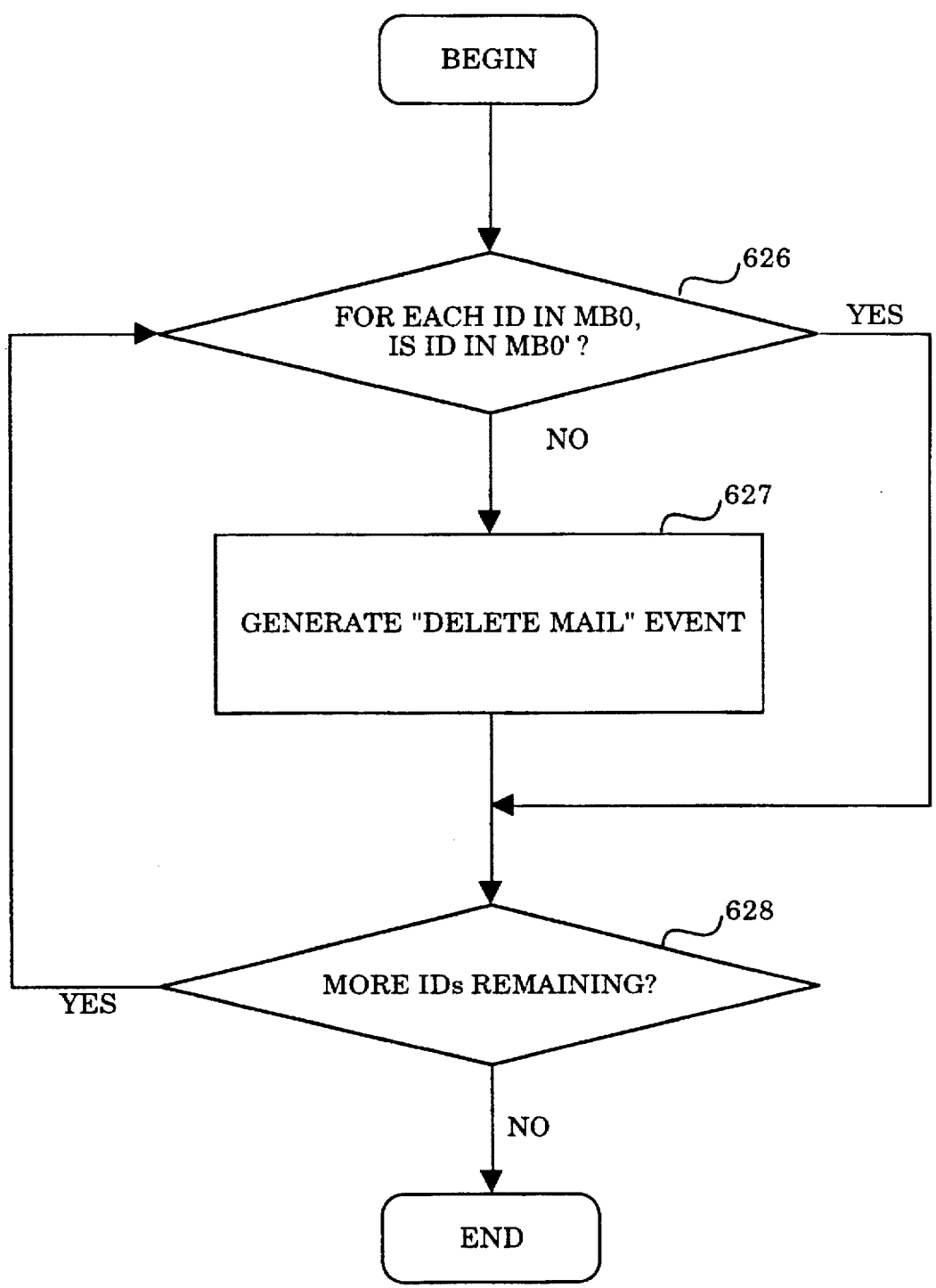

FIGS. 6c and 6d describe the general steps followed by the present invention in generating an event log for a mail. In step 621 of FIG. 6c, for each ID' in MB0', it is determined if ID' is in MB0. If the ID' for the mail generated by the steps followed and described in FIG. 6b is in MB0 and the two mails (including their folders) are the same in step 622, then it is determined whether there are more ID's to be checked in step 625. Otherwise, if the ID' for the mail is in MB0 but the two mails are not the same, then a "update mail" event is generated for that mail for the event log in step 623. Otherwise, if the ID' for the mail is not in MB0, then a "new mail" event is generated for that particular mail for the event log in step 624. If there are more ID's remaining for an event to be generated for the event log, then the process repeats itself until there are no more ID's remaining for which an event log entry must be generated.

In step 626 of FIG. 6d, for each ID in MB0, it is determined if ID is in MB0'. If ID is not in MB0', then a "delete mail" event is generated in step 627. Otherwise, if ID is in MB0', then the process repeats itself from step 628 until there are no more ID's remaining for which an event log entry must be generated.

Figure 6E:
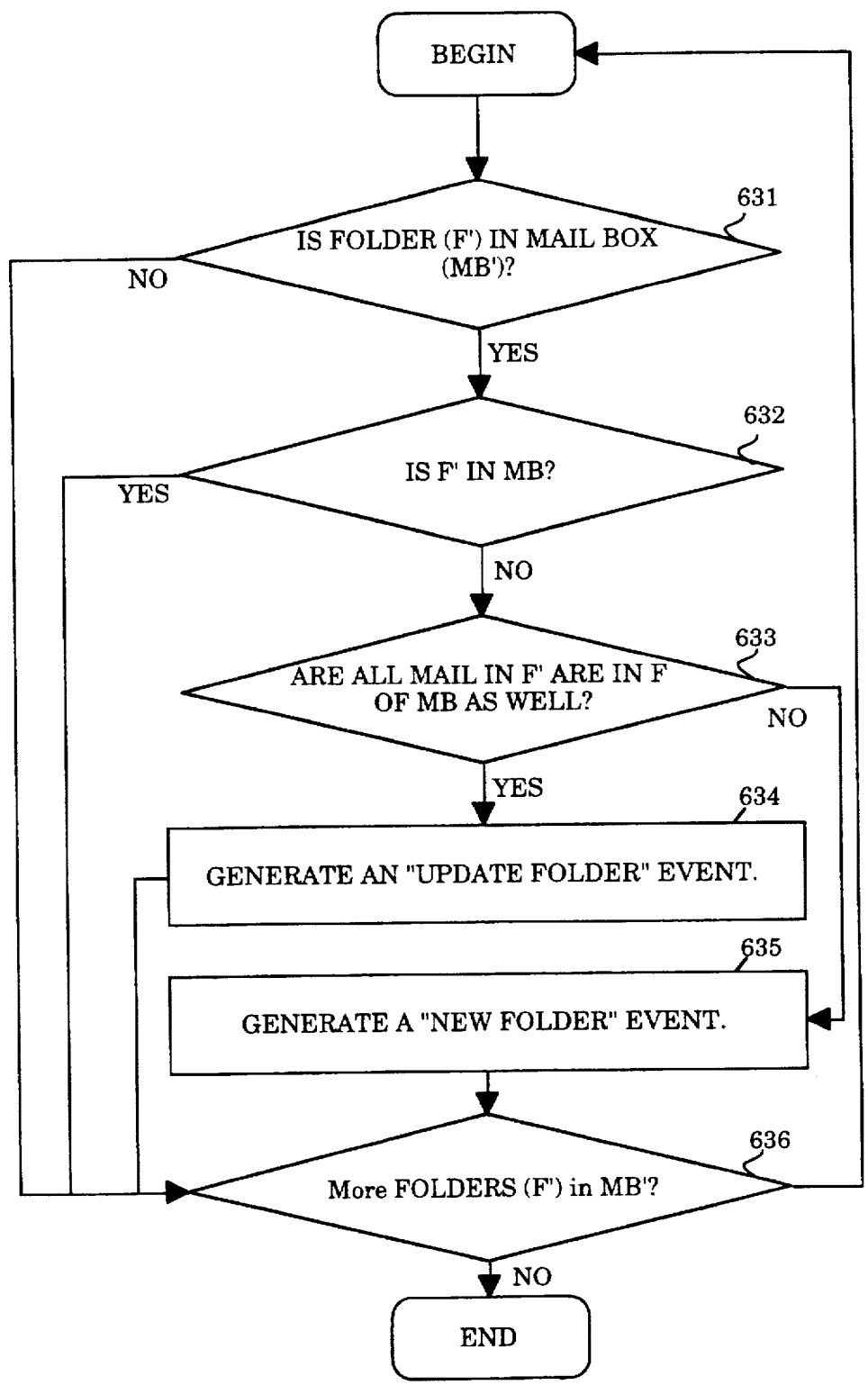
FIGS. 6e and 6f illustrate the general steps followed by the present invention in generating an event log for folders.
Figure 6F:
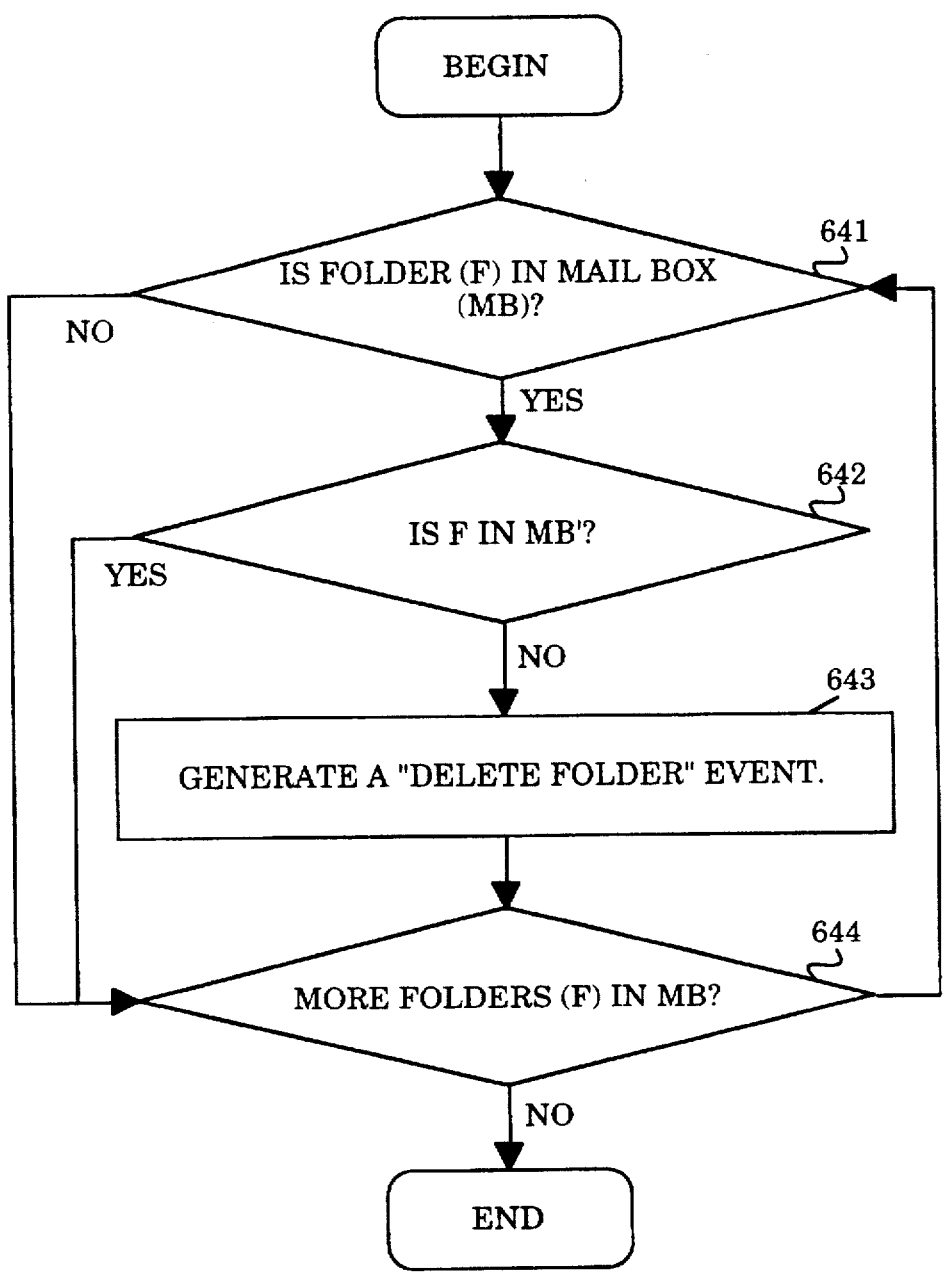

FIGS. 6e and 6f illustrate the general steps followed by the present invention in generating an event log for folders. In step 631 of FIG. 6e, if the folder F for which an event for the event log is to be generated is in mail box MB', but not in MB and all mail in F are in F of MB as well, then an "update folder" event is generated for the event log for that particular folder F in step 634. If folder F' is in mail box MB' but not in MB and all mail in F' are not in F of MB as well, then a "new folder" event is generated for that event log for that particular folder F' in step 635. In step 636, if there are more folders F' in MB' then the whole process is repeated until there are no more folders F' in MB'.

In FIG. 6f, in step 641, if folder F is in mail box MB but not in MB', then a "delete folder" event is generated for the event log for that particular folder F in step 643. In step 644, if there are more folders F remaining in MB then the whole process is repeated until there are no more folders M remaining in MB without an event generated for the event log.

Figure 7A:
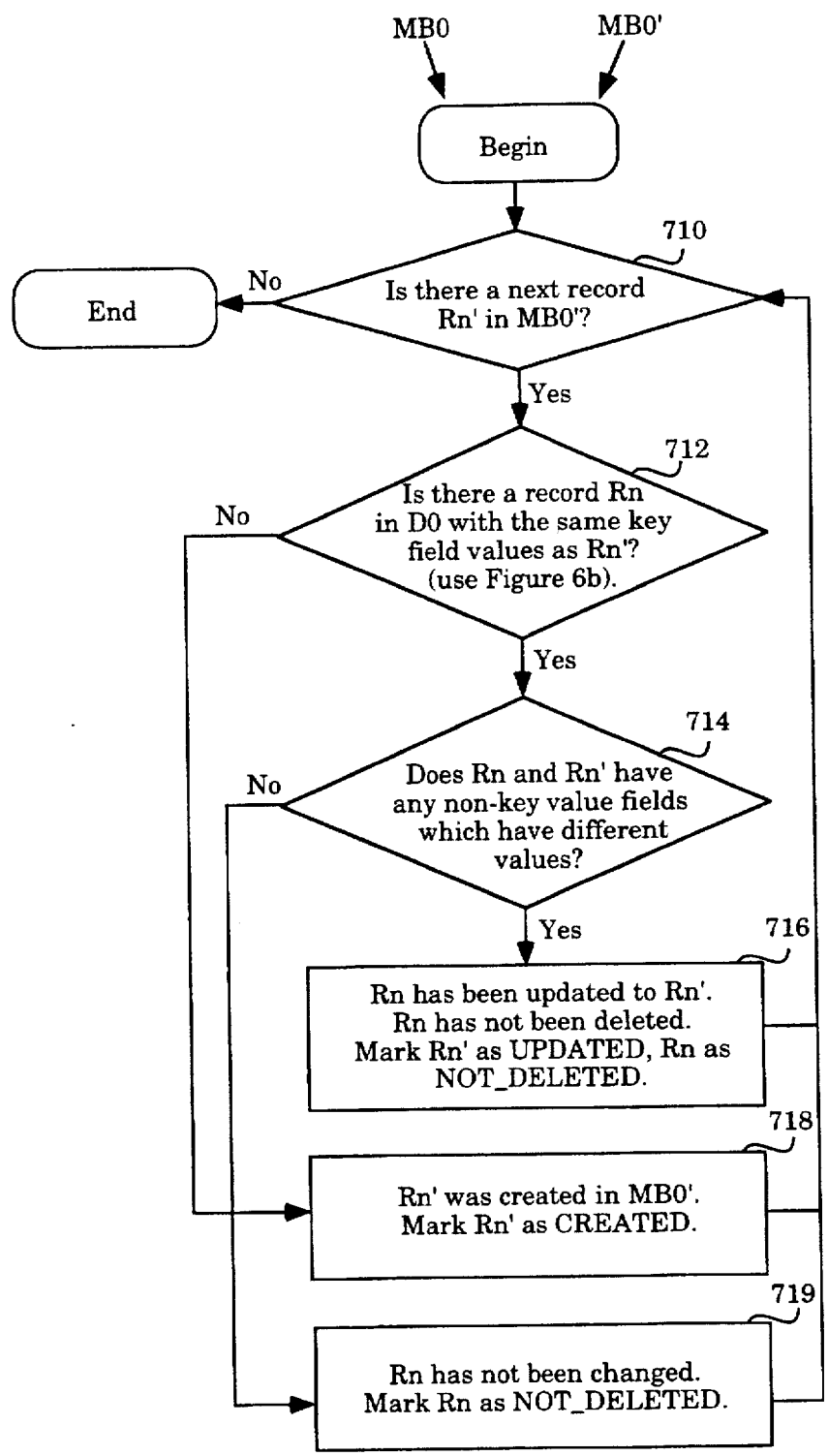
FIGS. 7a and 7b are flow charts describing the general steps followed by the Change Detection mechanism referred to in FIG. 3e.
Figure 7B:
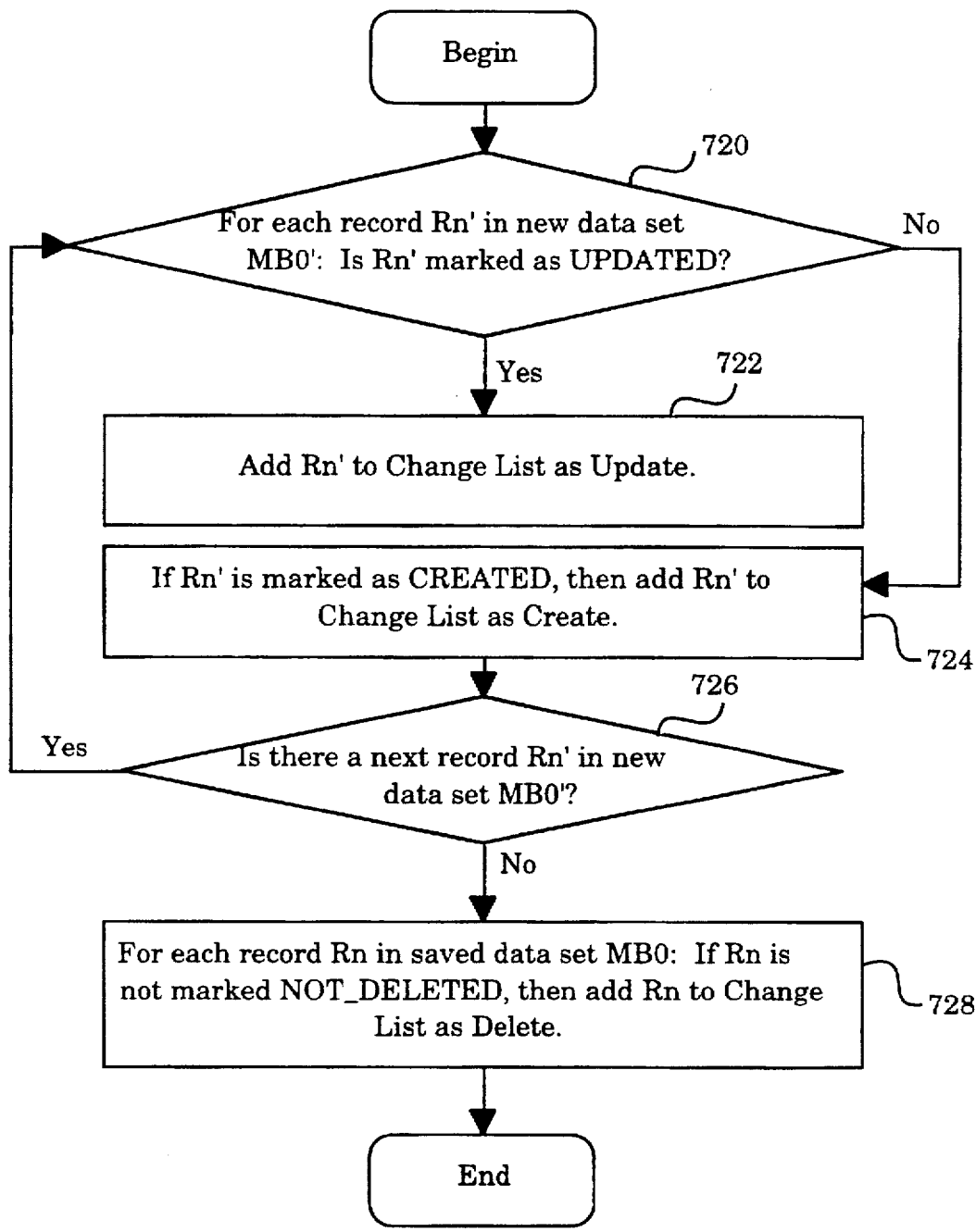

FIGS. 7a and 7b are flow diagrams describing the general steps followed by the Change Detection mechanism referenced in FIG. 3e.

Change Detection mechanism 302 deduces all the changes that have occurred in a given mail box since the last synchronization. This is accomplished by first saving a copy of the mail box at the end of a synchronization. At the next synchronization mail, the messages or folders are compared in the modified mail box (e.g. MB0') with the saved mail box (e.g. MB0), detecting the changes which must have happened since the last synchronization. In the case where the synchronization is run for the first time, there are no mail messages or folders in the saved mail box (e.g. MB0), and Change Detection mechanism 302 concludes that all current mail messages or folders have been created.

The steps followed by Change Detection mechanism 302 begins where first, mail boxes MB0 and MB0' are input to Change Detection mechanism 302. In step 710, if there is a next mail message or folder Rn' in mail box MB0', then in step 712, it is determined if there is a mail message or folder Rn in MB0 with the same Key Attribute values as Rn' (this is determined using the steps illustrated in the flow diagram of FIG. 6). If there is a mail message or folder Rn in MB0 with the same Key Attribute values as Rn' and in step 714, if Rn and Rn' have non-key value attributes which have different values, then in step 716, it is determined that Rn has been UPDATED to Rn' and Rn' is marked as UPDATED. In addition, since Rn has been UPDATED, it is determined that Rn has not been deleted and Rn is marked NOT_DELETED.

If mail messages or folders Rn and Rn' have the same values for all their Key Attributes and non-Key Attributes, then it is determined that Rn' has not been changed and Rn is marked as NOT_DELETED. In step 719, if there are no mail messages or folders Rn in MB0 with the same Key Attribute values as Rn', then Rn' is a new mail message or folder created in MB0' and Rn is marked CREATED. If there is a next mail message or folder Rn' in MB0', then return to step 710 until there are no more mail messages or folders Rn' in new mail box MB0'.

After all the mail messages or folders in mail box MB0' have been processed, all the mail messages or folders in MB0' become marked as either UPDATED or CREATED, and some mail messages or folders in MB0 become marked as NOT_DELETED.

In FIG. 7b, in step 720, for each mail message or folder Rn' in new mail box MB0', if Rn' is marked UPDATED then in step 722, Rn' is added to Change List as Update. Otherwise, if Rn' is marked CREATED, then in step 724, Rn' is added to Change List as CREATED. In step 726, if there is a next mail message or folder Rn' in the new mail box MB0', then the next mail message or folder Rn' in the new mail box MB0' is processed until there are no more mail messages or folders Rn' left to be processed. In step 728, for each mail message or folder Rn in the saved mail box MB0, if Rn is not marked NOT_DELETED, then Rn is added to Change List as DELETED. The process is repeated until all mail messages or folders Rn in the saved mail box MB0 are processed.

A Change List CL0 for original mail box MB0 and modified mail box MB0' reflecting the changes made from MB0 to MB0' has now been generated by Change Detection mechanism 302. (Refer to the exemplary CL0 data structure in FIG. 4c and FIG. 7d for illustration.) There are two conditions which may be encountered by Error Correction mechanism 305 which require Change Detection mechanism 302 to generate a Change List by working with Error Correction mechanisms one and two. Error Correction mechanisms one and two are described in more detail in the descriptions accompanying FIGS. 8a through 8d below.

FIG. 7c illustrates an exemplary Change List data structure modified by the steps described in the flow diagram of FIG. 7a. Data structure 730 contains a list of mail messages or folders Rm, Rn, Rp, Rq, etc. (contained in mail box MB0) as well as a corresponding list of NOT_DELETE flags. Data structure 732 contains a list of mail messages or folders Rm', Rn', Rp', etc. (contained in mail box MB0') as well as a list of corresponding NOT_DELETE flags.

FIGS. 8a through 8d are flow charts describing the general steps followed by Error Correction mechanism 305 referenced in FIG. 3. In the Figures, the functions of Error Correction mechanism 305 is divided into two parts and will be referred to as Error Correction mechanisms one and two.

There are two error conditions which may be encountered by Error Correction mechanism 305. Error case 1 is where a record's Key Attribute changes in mail box MB0'. Error case 2 is where more than one mail message or folder is sharing the same Key Attribute values (a non-unique identifier case).

In error case 1, the correct result to be produced by Change Detection mechanism 302 is that Rn' is Updated. Since the Key Attribute is changed during the synchronization process, assuming the changed Key Attributes are still unique, Change Detection mechanism 302 deduces that Rn was Deleted, and Rn' was Created. A Delete and a Create is equivalent to an Update, since Rn' also contains all the unmodified attributes in Rn, as well as any attributes a user or an application normally chooses not to synchronize. Thus no correction is needed. The case where Rn's Key Attributes are the same as one or more other record's Key Attributes is handled as an error case 2 described below.

For error case 2, Change Detection mechanism 302 deduces incorrect Updates and Creates. For example, assuming that messages or folders R1 and R2 have the same Key Attribute values and that R1' and R2' are unchanged, i.e. R1' has all the same attributes as R1 and R2' as R2. If Change Detection mechanism 302 is run on R2' before R1', it is possible for pseudo unique id generator 342 to erroneously determine that R1 has been updated to R2' and that R2 has been updated to R1'. The correct determination which should be made by pseudo unique id generator 342 is that neither R1 nor R2 has changed. Similarly, if R1' is unchanged but R2' has changed, it is possible for Change Detection mechanism 302 to determine that R1 has been updated to R2' and R2 has been updated to R1'. In either case, after results are produced by Change Detection mechanism 302, if R1 or R2 contains attributes not normally synchronized, R1's unsynchronized attributes would be exchanged with R2's unsynchronized attributes.

The invention corrects error case 2 using two procedures. In one procedure, pseudo unique id generator 342 first looks for a duplicate in MB0. If a duplicate exists in MB0, it is marked DUPLICATE_EXISTS as well as NOT_DELETED. In subsequent searches, Pseudo unique id generator 342 ignores any mail messages or folders in MB0 already marked as DUPLICATE_EXISTS. Pseudo unique id generator 342 will then return one of three possible results, DUPLICATE, CONFLICT, or NOT_FOUND. DUPLICATE is returned when there exists, for example, a mail message or folder Rx in MB0, for which all attributes match with mail message or folder Rn' in MB0'. CONFLICT is returned when there exists a record, for example, Rx in MB0, for which all Key Attributes match with mail message or folder Rn' in MB0' but one or more other attributes are different. NOT_FOUND is returned when there is no mail message or folder in MB0 for which all Key Attributes matches with those for Rn' in MB0'. This error correction mechanism for SUID mechanism will herein be referred to as Error Correction one.

The second procedure for correcting an error case 2 is as follows. In Error Correction one, when a CONFLICT is found, the conflict mail message or folder Rx in MB0 is also marked as CONFLICT_EXISTS, and an internal reference to mail message or folder Rn' is stored in MB0' for which Rx is a conflict. For future mail messages or folders seen in Error Correction one, if a DUPLICATE is found for a mail message or folder already marked as CONFLICT_EXISTS, mail message or folder Rx is marked in MB0 as DUPLICATE_EXISTS. Rn' is then retrieved and steps 700 to 706 of the flow diagram illustrated in FIG. 7a is performed on Rn' by Change Detection mechanism 302. Change Detection mechanism 302's error correction mechanisms will herein be referred to as Error Correction two. Error Correction one and two work together as described below.

Figure 8A:
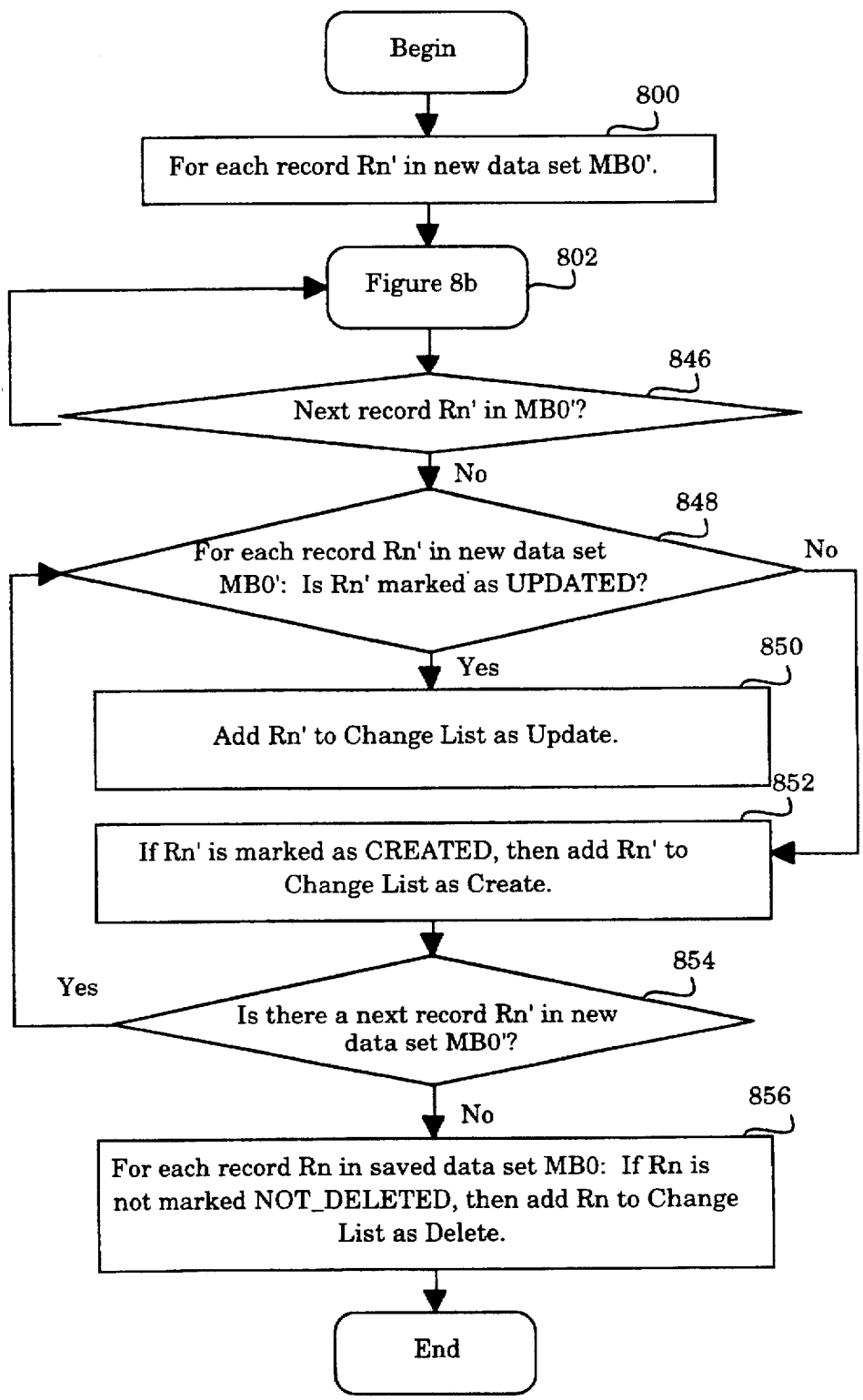
FIGS. 8a–8d are flow charts describing the general steps followed by the Error Correction mechanism referred to in FIG. 3e.
Figure 8B:
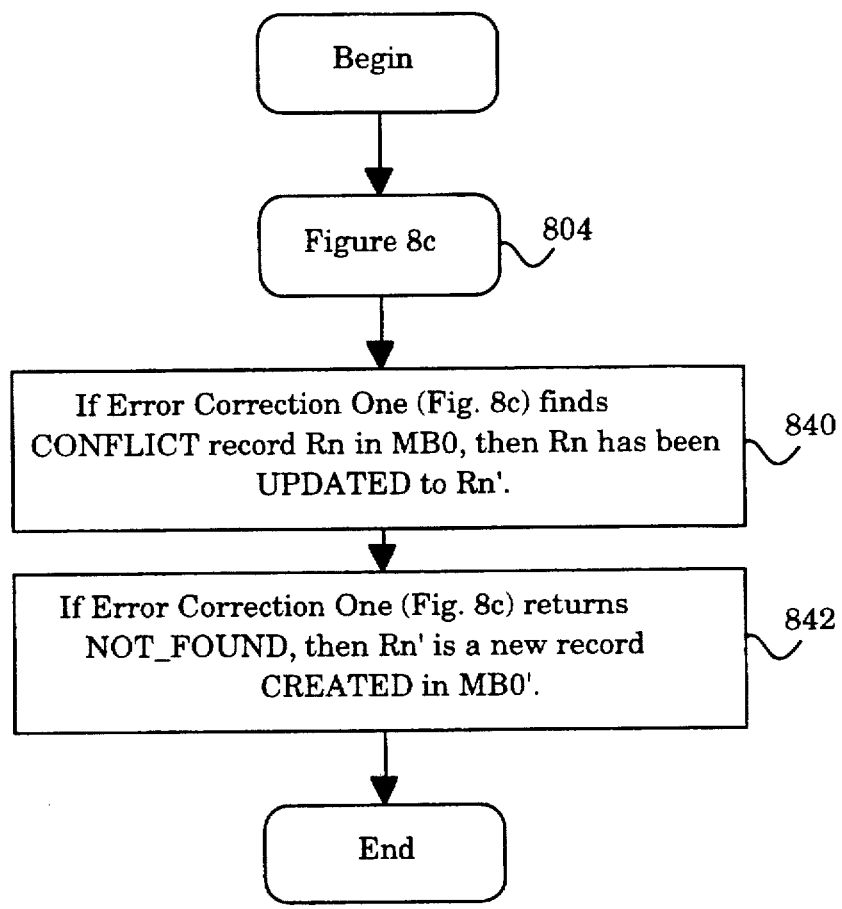

In FIG. 8a, Error Correction mechanism two takes as input, mail boxes MB0 and MB0'. In step 800, for each mail message or folder Rn' in new mail box MB0', the general steps illustrated in FIG. 8b are performed on Rn'. In FIG. 8b, the general steps illustrated in FIG. 8c is first performed with input of Rn'.

Figure 8C:
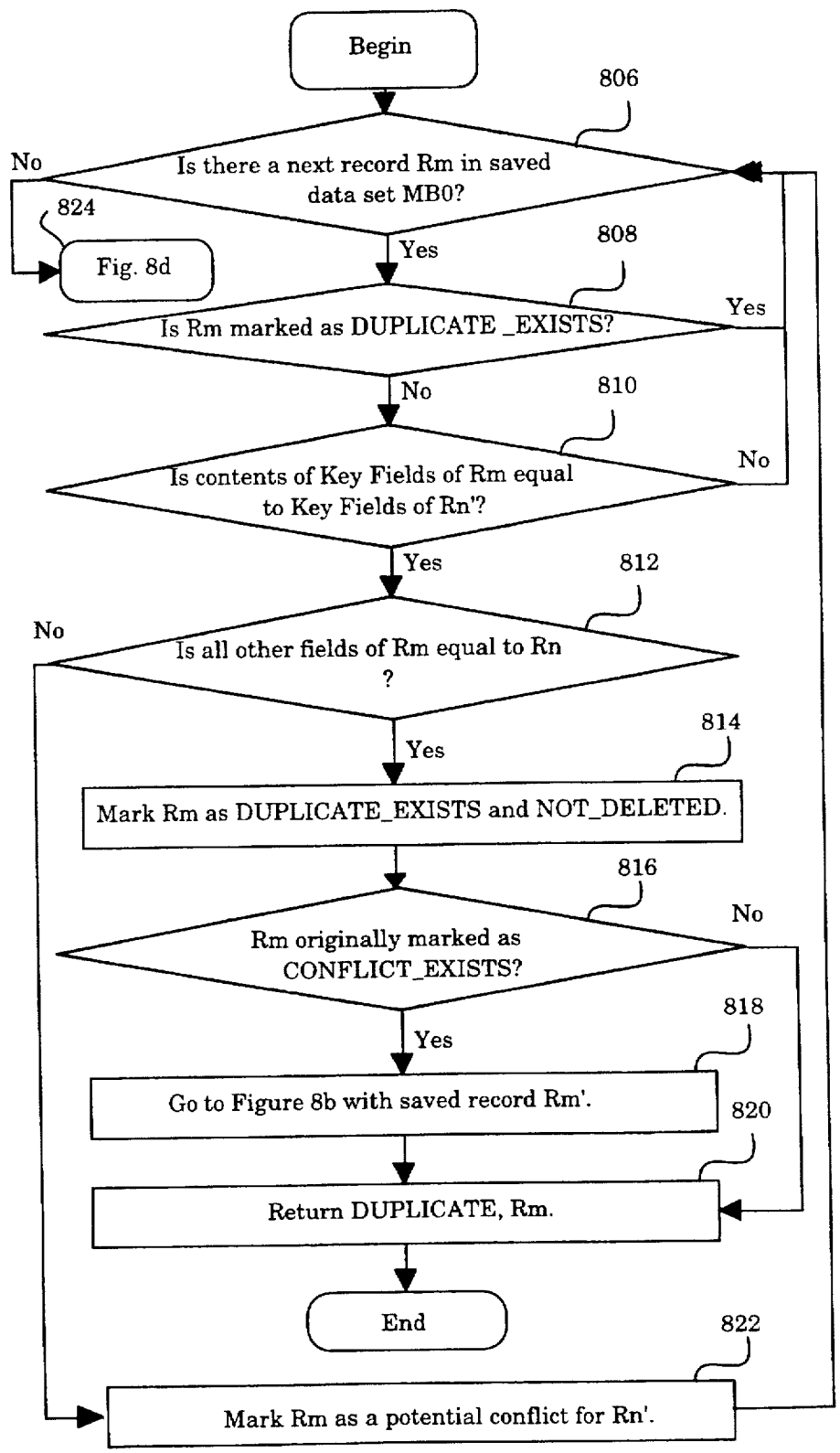
Figure 8D:
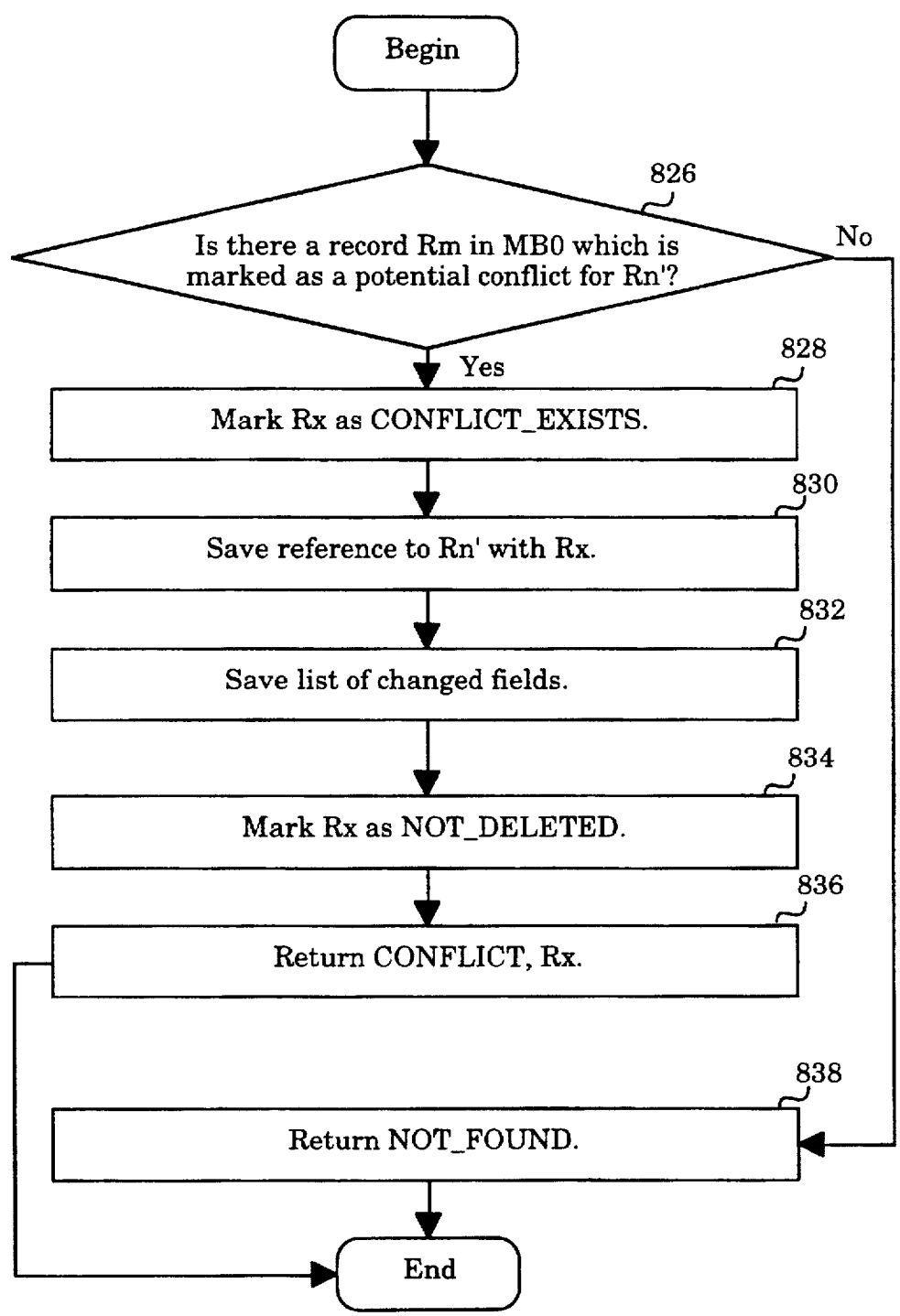

FIGS. 8c and 8d illustrate the general steps followed by Error Correction one. In FIG. 8c, in step 806, given input Rn' in MB0', for each mail message or folder Rm in saved mail box MB0, it is determined in step 808, if Rm is marked as DUPLICATE_EXISTS. If Rm is marked as DUPLICATE_EXISTS, then the next mail message or folder Rm in MB0 is processed back in step 806. Otherwise, in step 810, if the contents of the Key Attributes in Rm are equal to the contents of the Key Attributes in Rn', and in step 812, if all other attributes of Rm are equal to Rn', then in step 814, Rm is marked with DUPLICATE_EXISTS and NOT_DELETED. In step 816, if Rm was originally marked CONFLICT_EXISTS, then the steps in the flow diagram of FIG. 8b are followed with the saved mail message or folder Rm' as input. In step 820, DUPLICATE is returned for mail message or folder Rm.

Back in step 812, if the contents of the Key Attributes of Rm are equal to the contents of the Key Attributes of Rn' but one or more non-key attributes of Rm are not equal to Rn', then in step 822, Rm is marked as a potential conflict for Rn'. Back in step 806 the process illustrated in FIG. 8c are repeated until all mail messages or folders Rm in saved mail box MB0 are processed. After all mail messages or folders Rm are processed, the general steps illustrated in FIG. 8d are performed in step 824.

In FIG. 8d, in step 826, if there is a mail message or folder Rm which is a potential conflict for Rn', then in step 828, Rm is marked as CONFLICT_EXISTS, in step 830. Rm is also marked with a reference to Rn' reflecting the mail message or folder with which Rm has a conflict. In step 832, a list of changed attributes are saved. In step 834, Rm is marked as NOT_DELETED. In step 836, CONFLICT for mail message or folder Rm is returned. Back in step 826, if there are no mail messages or folders Rm which is a potential conflict for Rn' as determined in FIG. 8c, then NOT_FOUND is returned. The Key Attributes may also have no values. This is a valid entry and multiple mail messages or folders with no values for the Key Attributes are handled the same way as described above.

Back in FIG. 8b, in step 840, if Error Correction one (described in the flow diagrams of FIGS. 8c and 8d) finds CONFLICT for mail message or folder Rn in MB0, then it is determined that Rn has been UPDATED to Rn'. Otherwise, in step 842, if Error Correction one returns NOT_FOUND, then it is determined that Rn' is a new mail message or folder CREATED in MB0'.

Back in FIG. 8a, after all the mail messages or folders in mail box MB0' have been processed through steps 800, 802 and 846, all mail messages or folders in MB0' have been marked as either UPDATED or CREATED, and some mail messages or folders in MB0 have been marked as NOT_DELETED. In step 848, for each mail message or folder Rn' in new mail box MB0', if Rn' is marked UPDATED, then in step 850, Rn' is added to the Change List as UPDATED. Otherwise, in step 852, if Rn' is marked CREATED, then Rn' is added to the Change List as CREATED. After steps 848 through 854 are performed for all mail messages or folders Rn' in new mail box MB0' step 856 is performed. In step 856, for each mail message or folder Rn in saved mail box MB0, if Rn is not marked NOT_DELETED then Rn is added to the Change List (CL0) as DELETED. A list of changes (Change List) from mail box MB0 to mail box MB0' is therefore generated by Change Detection mechanism 302 and by Error Correction mechanism 305.

FIGS. 9a through 9e are flow charts describing the general steps followed by the Synchronization mechanism referred to in FIG. 3e. Mail messages for folders Rn and Rm are exemplary mail messages or folders in mail box MB0 and mail messages or folders Rx and Ry are exemplary mail messages or folders in mail box MB1.

Error Correction mechanisms one and two generate a list of changes when comparing a changed mail box MB0' to a saved mail box MB0. When synchronizing mail boxes MB0' and MB1', Error Correction two, first processes mail boxes MB0' and MB0, producing Change List 0 (CL0), and then processes mail boxes MB1' and MB1, producing Change List 1 (CL1). Mail boxes MB0 and MB1 may or may not be data from the same application or have the same format. However, mail boxes MB0 and MB1 are equivalent (i.e. synchronized) since they are saved at the end of the last synchronization and there may be only one mail box saved.

Given accurate Change Lists CL0 and CL1 as produced by the present invention, techniques to modify MB0' and MB1' so that they become equivalent would be readily understood by those skilled in the art. FIGS. 9a through 9e and FIGS. 10a and 10b illustrate an exemplary method.

Figure 9A:
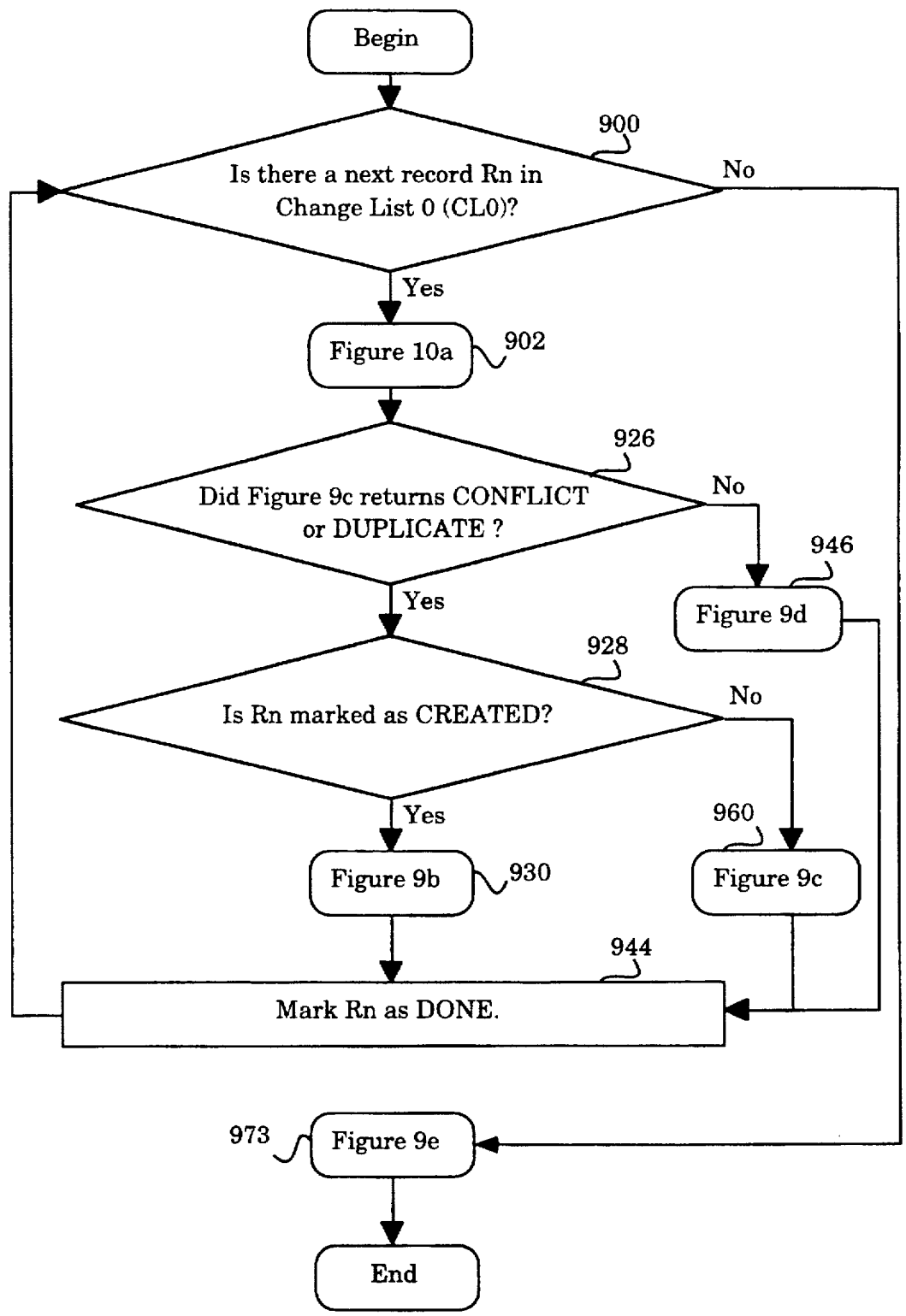
FIGS. 9a–9e, and 10a and 10b are flow charts describing the general steps followed by the Synchronization mechanism referred to in FIG. 3e.
Figure 9B:
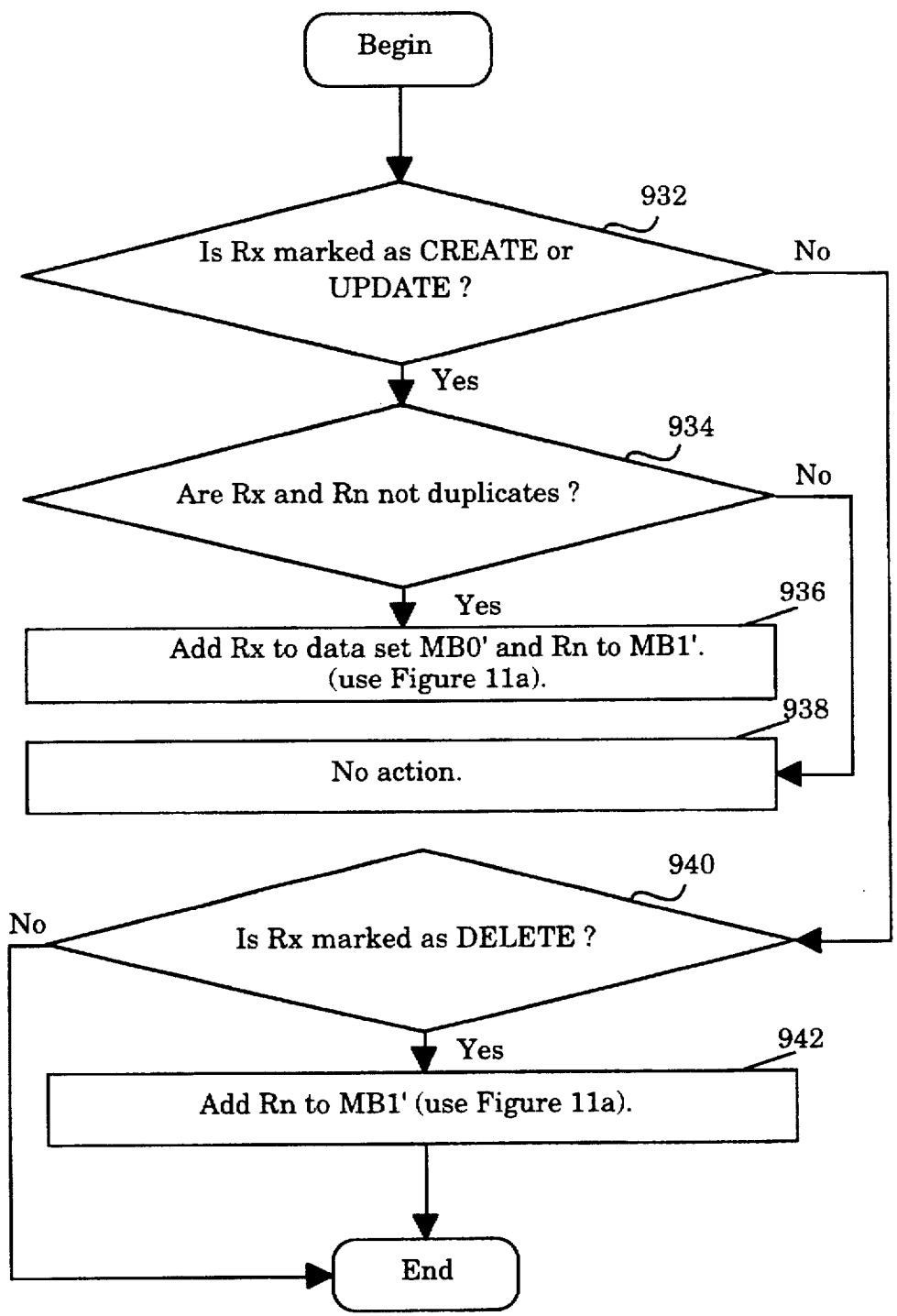
Figure 10A:
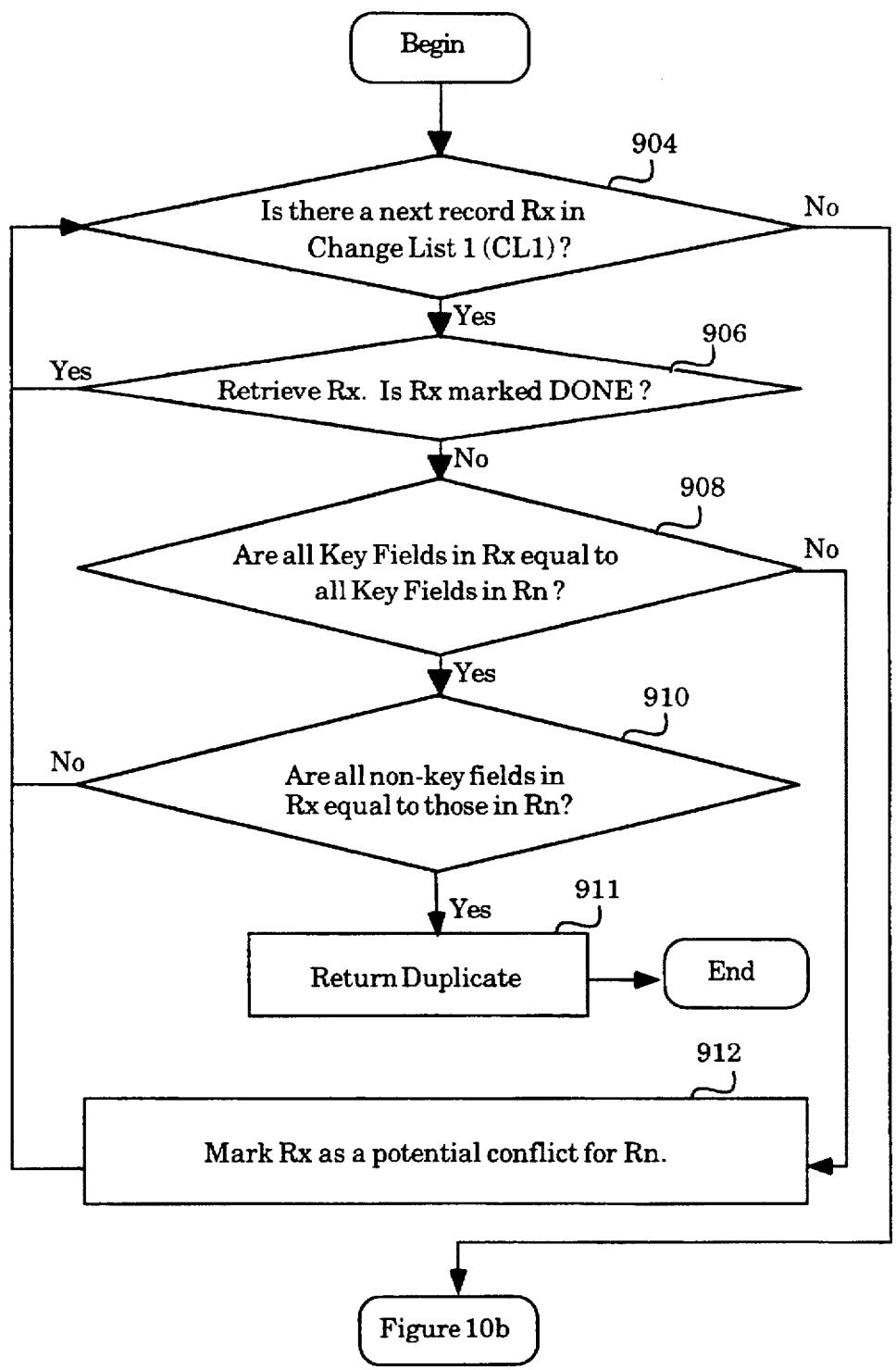
Figure 10B:
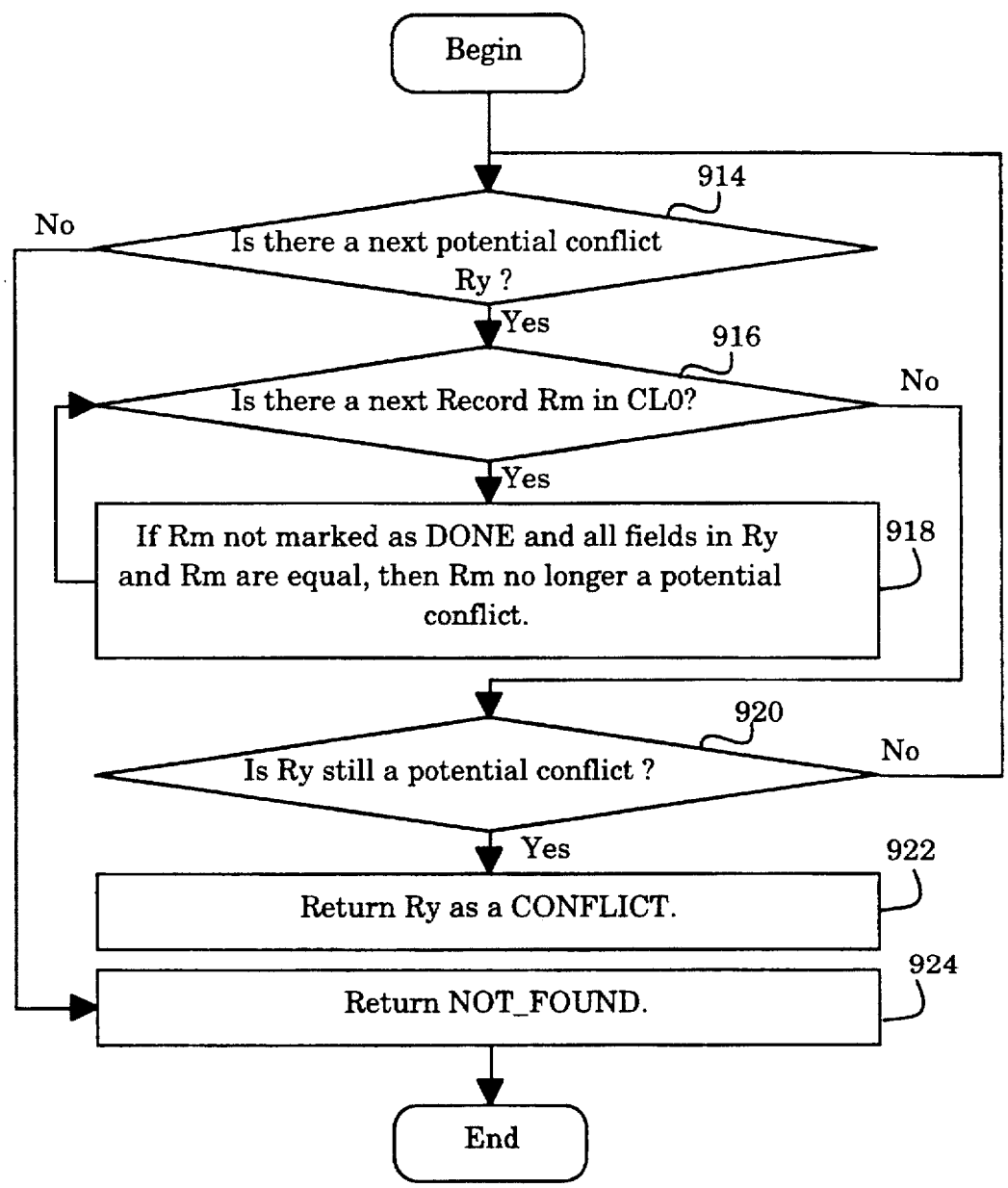

In FIG. 9a in step 902, the general steps illustrated in FIG. 10a and 10b are first performed for mail message or folder Rn given Change List CL1.

In FIG. 10a, for each mail message or folder Rx in CL1 in step 904, if Rx is not marked DONE in step 906, then in step 908, it is determined if all Key Attributes in Rx are equal to all Key Attributes in Rn. If all Key Attributes in Rx are equal to all Key Attributes in Rn, and in step 910, if all non-key attributes in Rx are equal to those in Rn, then a flag indicating that a duplicate exists (DUPLICATE) is returned for Rx in step 911. Otherwise, if one or more key attributes in Rx are not equal to those in Rn, then the process returns to step 904 to retrieve the next mail message or folder Rx in CL1. Back in step 908, if one or more non-key Attributes are not equal to those in Rn, then in step 912, Rx is marked as a potential conflict for Rn. This process is repeated from step 904 to step 912 until all mail messages or folders Rx in CL1 are processed.

When all mail messages or folders Rx are processed, the general steps illustrated in FIG. 10b are performed. In steps 914 and 916, for each potential conflict Ry, each mail message or folder Rm in CL0 is processed. In step 918, if Rm is not marked DONE and if all attributes in Ry and Rm are equal, then Rm is no longer marked as a potential conflict. Back in step 916, if there are no more mail messages or folders Rm in CL0, then in step 920, if Ry is still a potential conflict, then in step 922 CONFLICT for Ry is returned. If all potential conflicts Ry are processed or if there are no potential conflicts Ry, then in step 924, NOT_FOUND is returned to indicate that there are no conflicts.

If operations illustrated in FIGS. 10a and 10b return a result of CONFLICT or DUPLICATE, and in step 928, if Rn is marked as CREATE, then it is determined in step 932 (of FIG. 9b) whether Rx is marked as either CREATE or as UPDATE. If Rx is marked as either CREATE or UPDATE, and in step 934 if Rx and Rn are not duplicates, then in step 936, Rx is added to MB0' (using the steps illustrated in FIG.

Figure 11A:
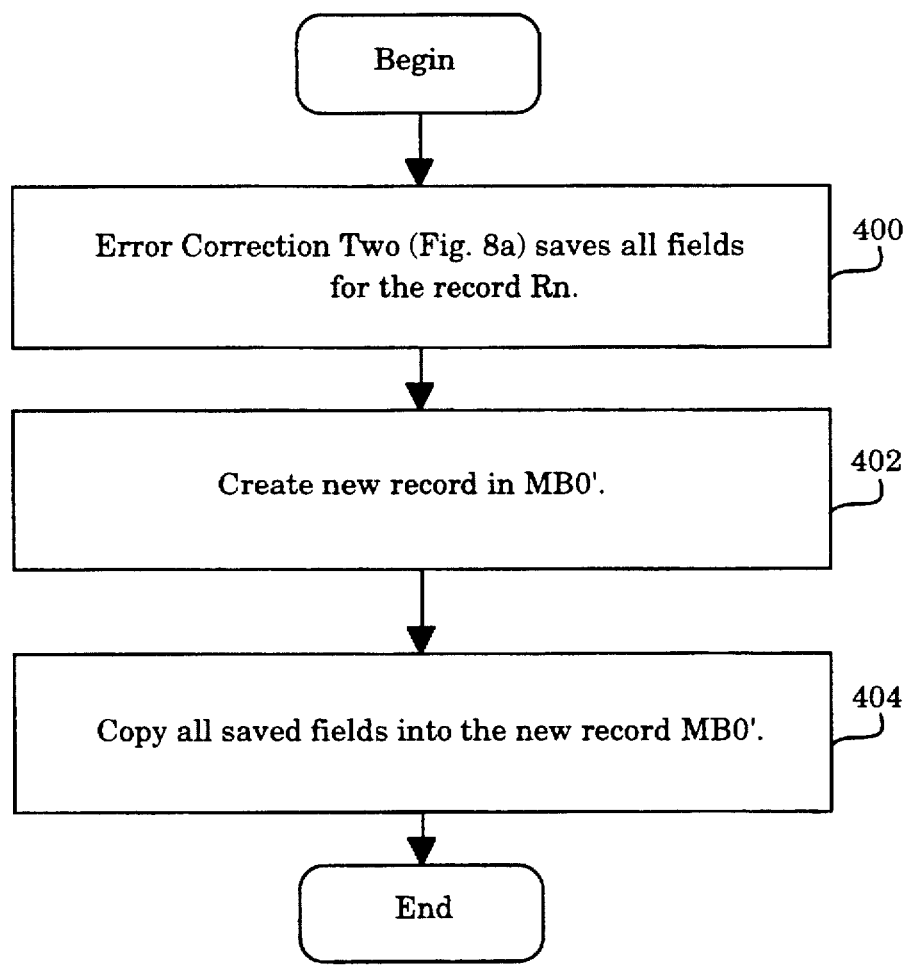
FIGS. 11a–11c are flow charts describing the general steps followed by the Change Existing Data mechanism referred to in FIG. 3e.

11a) and Rn is added to MB1' (using the steps illustrated in FIG. 11a). Back in step 934, if Rx and Rn are duplicates, then in step 938 no action is taken. Back in step 932, if Rx is not marked as CREATE or UPDATE, and in step 940 if Rx is instead marked as DELETE, then in step 942, Rn is added to MB1' (using the steps illustrated in FIG. 11a). In step 944, Rn is marked as DONE, and the next mail message or folder Rn in CL0 is processed.

Figure 9C:
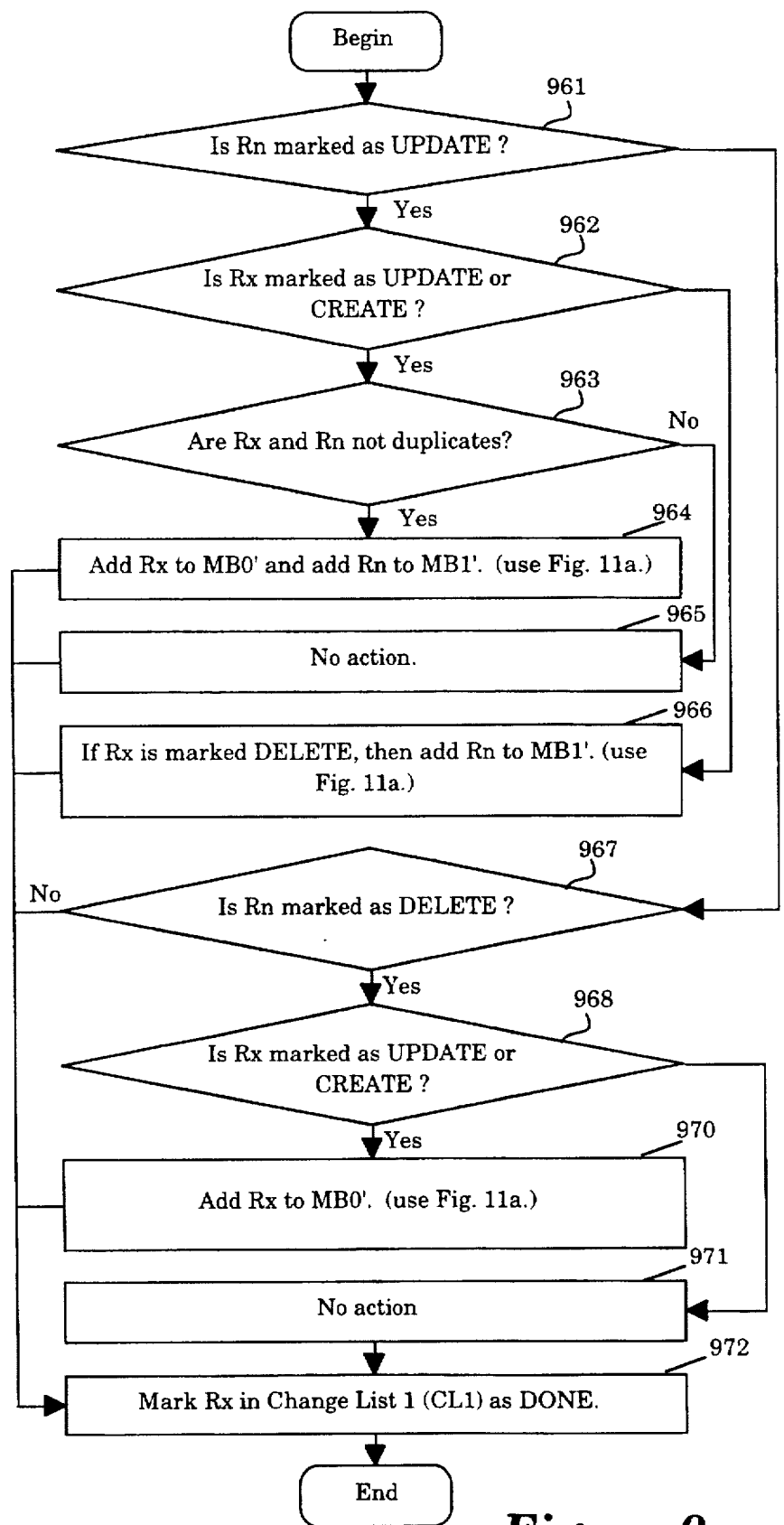
Figure 9D:
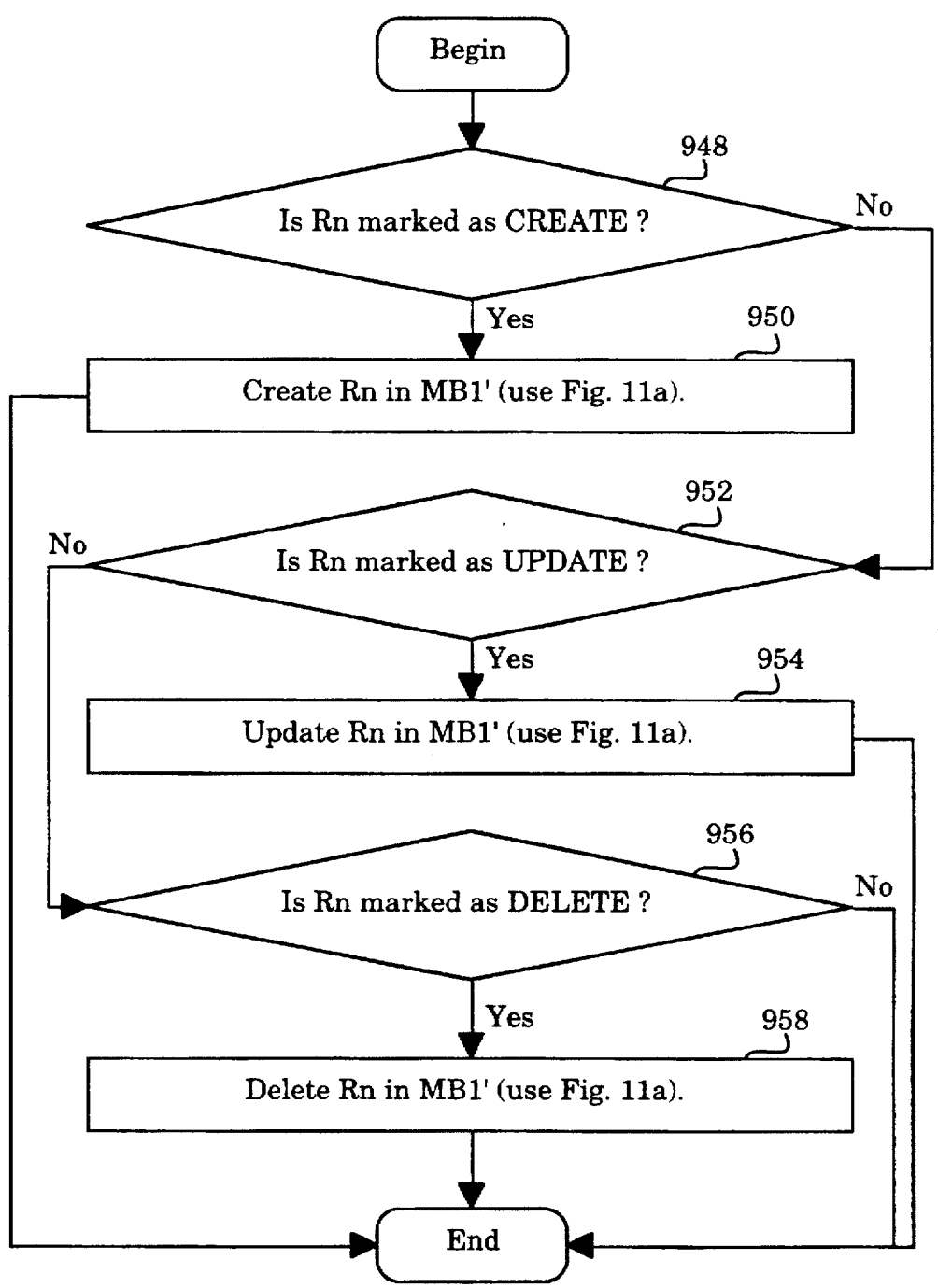

Back in step 926, if the result from the operations illustrated in FIGS. 10a and 10b is neither CONFLICT or DUPLICATE, then the general steps illustrated in FIG. 9d are performed. In step 948, if Rn is marked CREATE, then in step 950, Rn is created in MB1' (using the steps illustrated in FIG. 11a). Otherwise, in step 952, if Rn is marked UPDATE, then in step 954 Rn is updated in MB1' (using the steps illustrated in FIG. 11a). If Rn is not marked UPDATE or CREATE, and in step 956 if Rn is marked DELETE, then in step 958 Rn is deleted in MB1' (using the steps illustrated in FIG. 11a). In step 944, Rn is marked as DONE and the next mail message or folder Rn in CL0 is processed. Back in step 928, if Rn is not marked as CREATE, then the general steps illustrated in FIG. 9c are followed.

In FIG. 9c, in step 961, if Rn is marked UPDATE, then in step 962, it is determined if Rx is marked UPDATE or CREATE. If Rx is marked UPDATE or CREATE, then in step 963 if Rx and Rn are not duplicates, then in step 964 Rx is added to MB0' (using the steps illustrated in FIG. 11a) and Rn is added to MB1' (using the steps illustrated in FIG. 11a). In step 972, Rx in CL1 is marked as DONE.

Back in step 963, if Rx and Rn are duplicates, then in step 965, no action is taken. In step 972, Rx in CL1 is marked as DONE. Back in step 962, if Rx is neither marked as UPDATE nor as CREATE, and in step 966, if Rx is marked DELETE, then Rn is added to MB1' (using the steps illustrated in FIG. 11a). In step 972, Rx in CL1 is marked as DONE.

Back in step 961, if Rn is not marked as UPDATE, then in step 967, it is determined if Rn is marked as DELETE. If Rn is not marked as DELETE, then in step 972, Rx in CL1 is marked as DONE. If Rn is marked as DELETE, and in step 968, if Rx is marked UPDATE or CREATE then in step 970, Rx is added to MB0'. If Rx is not marked as UPDATE or CREATE, then in step 971, no action is taken. In step 972, Rx in CL1 is marked as DONE. When the process in FIG. 9c is completed, Rn in CL0 is marked as DONE back in step 944 of FIG. 9a. Back in step 900 of FIG. 9a, if there are no more mail messages or folders Rn in CL0, then the general steps illustrated in FIG. 9e are followed.

Figure 9E:
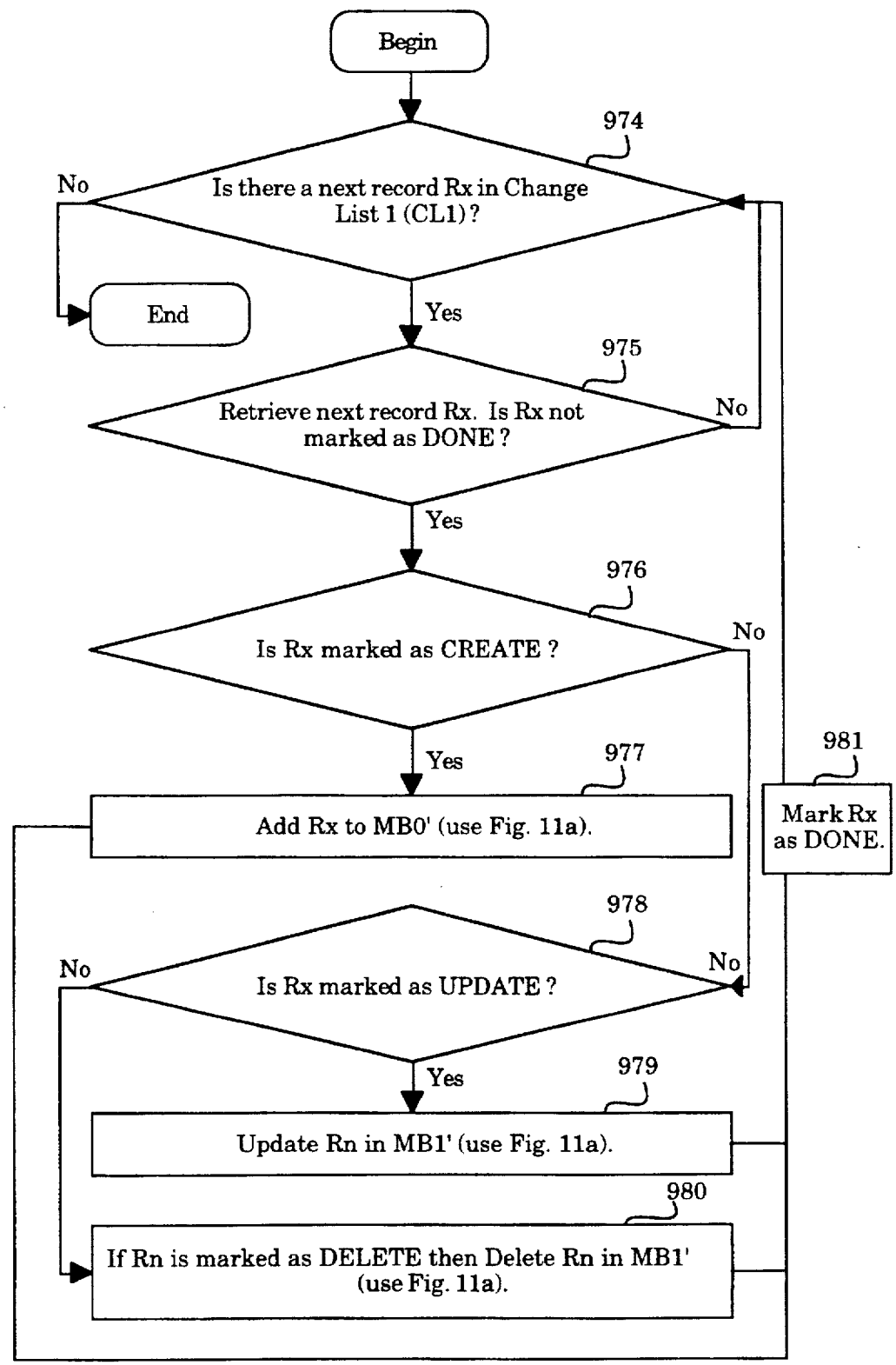

In FIG. 9e, for each mail message or folder Rx in CL1, if Rx is not marked as DONE in step 975, then in step 976 it is determined if Rx is marked as CREATE. If Rx is marked as CREATE, then in step 977, Rx is added to MB0' (using the steps illustrated in FIG. 11a). In step 981, Rx is marked as DONE. Back in step 976, if Rx is not marked as CREATE, then in step 978 it is determined if Rx is marked as UPDATE. If Rx is marked as UPDATE, then in step 979 Rx is updated in MB0' (using the steps illustrated in FIG. 11a). In step 981, Rx is marked as DONE. Back in step 978, if Rx is not marked as UPDATE, and if Rx is marked as DELETE in step 980, then Rx is deleted in MB0' (using the steps illustrated in FIG. 11a). In step 981, Rx is marked as DONE. The steps from step 974 to step 980 are repeated until all mail messages or folders Rx in CL1 are processed. At this point, the mail messages or folders in MB0' and MB1' are equivalent, i.e. synchronized.

With the availability of a complete history of the changed data as produced above, it is possible to make automatic decisions for conflict resolution. In addition, there is little danger of incorrectly overwriting or deleting data. This allows synchronization to run unobtrusively in the background without having to ask a user to confirm before overwriting or deleting data.

Figure 11B:
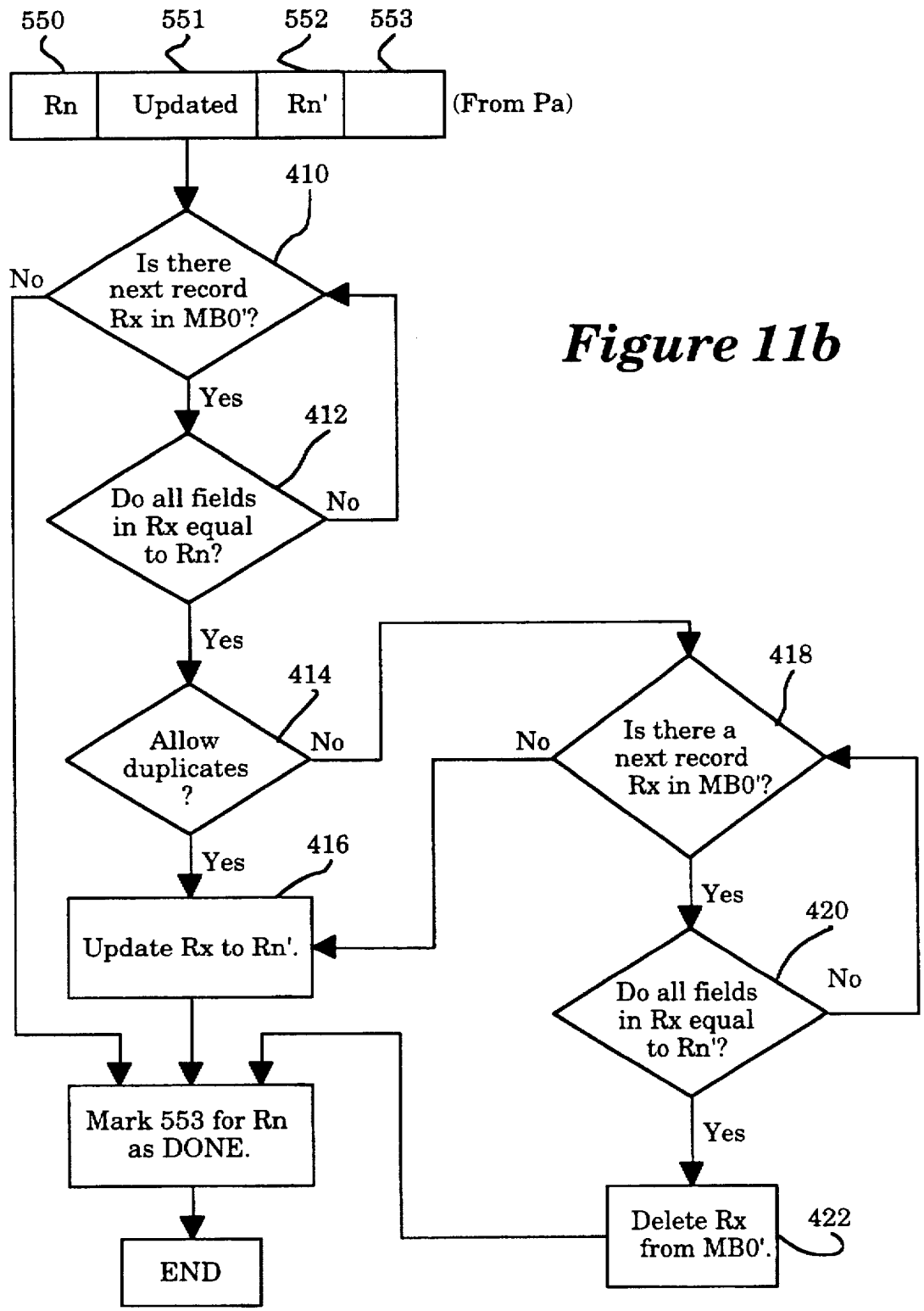
Figure 11C:
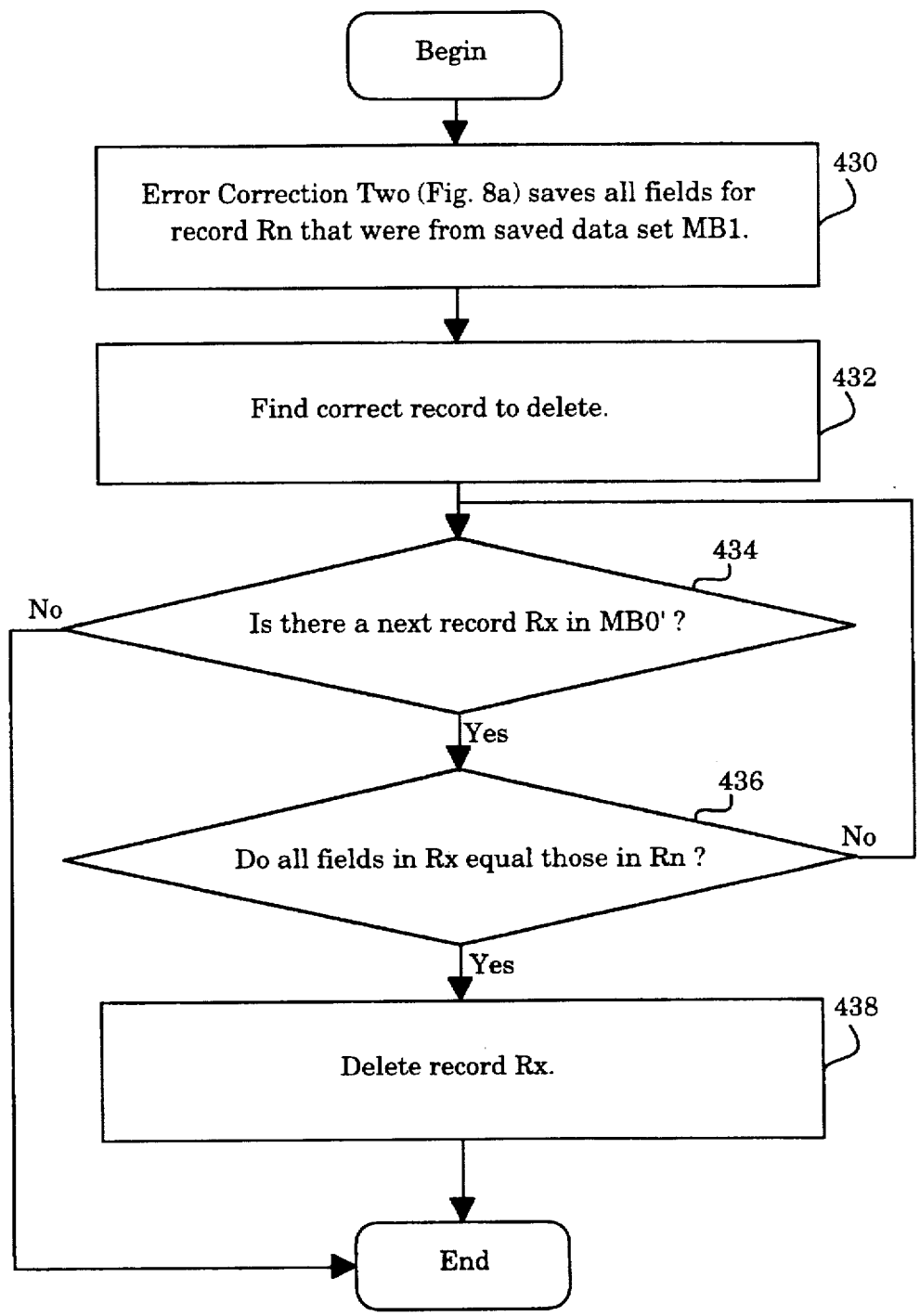

FIGS. 11a through 11c are flow diagrams describing the general steps followed by the Change Existing Data mechanism referred to in FIG. 3. Although the details for importing and exporting data is application specific and well understood, making the required changes to the mail boxes without unique mail message or folder identifiers is nontrivial. Such case is resolved by Change Existing Data mechanism 308.

Change Existing Data mechanism 308 can change an existing mail box such as MB0' in three ways: Create a record, Update a record, and Delete a record. A method for each is described in detail in FIGS. 11a, 11b and 11c with instructions on specific information regarding each mail message or folder which must be retained by Error Correction mechanism two.

FIG. 11a illustrates the general steps by which a mail message or folder Rn is Created in MB0'. In step 400, Error Correction mechanism two saves all attributes for mail message or folder Rn. In step 402, a new mail message or folder is then created in MB0'. In step 404, all saved attributes are copied into the newly created mail message or folder in MB0'.

FIG. 11b illustrates the general steps by which a mail message or folder Rn is updated in MB0'. Error Correction Mechanism two saves all original attributes for mail message or folder Rn, as well as all attributes in Rn', the new values for Rn. This is described in FIGS. 8d and 8e, and the resulting Change Log entry is shown in FIG. 11b. First the correct mail message or folder to update is searched by comparing original mail message or folder Rn with all mail messages or folders in MB0', until a mail message or folder Rx is found for which all of Rx's attributes are equal to those in Rn in steps 410, 412 and 414. Then the attributes of Rx are updated with the attributes in Rn' in step 416. If duplicate mail messages or folders (where all attributes are the same) are not allowed or desired in MB0', an extra step is needed before updating Rx. In addition to searching for Rx above, all mail messages or folders in MB0' are also searched in steps 418 and 420 to find a duplicate for Rn'. If a duplicate exists, then there is no need to update Rx to Rn', since this will result in two mail messages or folders with exactly the same attributes. The correct action here is to delete Rx from MB0' in step 422.

Finally, in step 424, Rn is marked DONE (in 553).

FIG. 11c illustrates the general steps by which a mail message or folder Rn is Deleted in MB0'. In step 430, Error Correction mechanism two saves all attributes for mail message or folder Rn that were from the saved mail box MB1. In step 432, the correct message or folder to delete is searched. In step 434, for each mail message or folder Rx in MB0', it is determined in step 436 if all attributes in Rx equal the attributes in Rn. If all attributes in Rx are equal to those in Rn then in step 438, mail message or folder Rx is deleted. Otherwise, the next mail message or folder Rx in MB0' is retrieved for similar processing back in step 434.

It is important to match all attributes in step 436 before deleting. If only the Key Attributes are examined, it is possible to delete the wrong mail message or folder if more than one mail message or folder has the same value in their Key Attributes. In addition, it is pertinent for Error Correction mechanism two to save the attribute values for mail message or folder Rn from the saved mail box MB1. This is due to the fact that some attributes in Rn may have changed in MB1' before the entire mail message or folder is deleted. A request to Delete a mail message or folder in MB0' can only come from running Error Correction mechanism two on MB1' and MB1. In addition, the Delete operation illustrated in FIG. 1c would only be used if the equivalent mail message or folder Rx in MB0' has not been changed, and thus guarantees that the Delete operation would find the correct mail message or folder to delete.

FIG. 12 is a table 440 illustrating the Synchronization mechanism 306 of the present invention. Column 442 of table 440 indicates case numbers. Column 444 indicates the changes in mail box MB0. Column 446 indicates the changes in mail box MB1. Column 448 indicates the result of the changes in mail box MB0. Column 450 indicates the result of the changes in mail box MB1. R1+ indicates that R1 has been added (i.e. created) to the data set. R1− indicates that R1 has been deleted from the data set. R1→R1' indicates that R1 has been changed (i.e. updated) to R1'.

Change Detection mechanism 302 produces the cases as described in column 444 for changes to mail box MB0 and column 446 for changes to mail box MB1. Columns 448 and 450 describe what Synchronization mechanism 306 must perform given CL0 and CL1. More specifically, column 448 describes the action resulting in the changes to mail box MB0 and column 450 describes the action resulting in the changes to mail box MB1. If the additional inputs to Synchronization mechanism 306 are MB0 and MB1, then all actions described in columns 448 and 450 must be performed. If the additional inputs are MB0' and MB1', then only those actions which are circled must be performed. It is assumed for the sake of illustration that all mail messages or folders R1, R2, R3, etc., have unique Key Attribute values.

FIG. 13 is a table 460 illustrating cases which may occur if there are mail messages or folders with the same Key Attribute values. These mail messages or folders are referred to as RR1, RR2, RR3, etc., and RR1', RR2', RR3' etc., and have the same Key Attribute values (e.g. same name in a phone book of records). The columns 462 through 470 indicate the same entries as those described for the table in FIG. 12.

What has been described is a method and an apparatus for performing mail message or folder level synchronization on two or more applications. Message or folder level synchronization overcomes the limitations of the prior art technique by synchronizing the individual mail messages or folders. It uses knowledge of how individual messages/folders are stored in a file. Mail message or folder level synchronization of the present invention leads to a more efficient and accurate synchronization as compared to the prior art synchronization technique, without requiring individual applications to implement a standard means for supporting synchronization.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

What is claimed is:

1. An apparatus for synchronization of a first set of mail with a second set of mail at a mail message or folder level, said apparatus comprising:

a memory which contains,
- a pseudo unique identification generator generating an identification for each said mail message or folder,
- an event log generator generating an event for an event log for each said mail message or folder with said identification, said event log generator coupled to said pseudo unique identification generator,
- a synchronization mechanism making said first set of mail and said second set of mail equivalent and generating the same synchronization results regardless of whether one or both of said first and second sets of mail are modified prior to synchronization, said synchronization mechanism coupled to said event log generator; and
- a processor coupled to said memory, said processor running said event log generator, said pseudo unique identification generator and said synchronization mechanism.

2. The apparatus of claim 1 wherein said synchronization mechanism comprises a change detection mechanism for generating a change list for said first and second sets of mail, said change list listing the changes made at a mail message or folder level to said first and second sets of mail.

3. The apparatus of claim 1 wherein said change detection mechanism further comprises an error correction mechanism for identifying duplicate entries in said first and second set of mail and mark said entries to indicate duplicate status.

4. The apparatus of claim 1 further comprising a change existing mail mechanism coupled to said error correction mechanism said change existing mail mechanism for correctly identifying a mail message or folder to update or delete without requiring said mail message or folder in said first and second sets of mail to contain system assigned unique identifiers.

5. An apparatus for synchronization of a first set of mail with a second set of mail at a mail message or folder level, said apparatus comprising:
   - means for containing,
     - means for generating a change list for said first and second sets of mail, said change list listing the changes made at a mail message or folder level to said first and second sets of mail, and
     - means for synchronizing said first set of mail and said second set of mail by using the information in said change list generated by said change detection mechanism, said means for synchronizing producing the same synchronization results regardless of whether one or both of said first and second sets of mail are modified prior to synchronization said means for synchronizing coupled to said means for generating; and
   - means for running said means for generating and said means for synchronizing, said means for running coupled to said means for containing.

6. The apparatus of claim 5 wherein said means for generating further comprises:
   - first means for identifying whether a mail message or folder in a given mail box is a duplicate of a corresponding mail message or folder in a modified mail box by using the contents of individual attributes in said mail message or folder; and
   - second means for identifying said duplicate which was not identified by said first means for identifying.

7. The apparatus of claim 5 further comprising means for correctly identifying a mail message or folder to update or delete without requiring said mail message or folder in said first and second set of mail to contain system assigned unique identifiers.

8. A computer system for synchronization of a first set of mail with a second set of mail at a message or folder level, said system comprising:
   - a memory which contains,
     - a change detection mechanism generating a change list for said first and second sets of mail, said change list listing the changes made at a mail message or folder level to said first and second sets of mail, and
     - a synchronization mechanism making said first set of mail and said second set of mail equivalent by using the information in said change list generated by said change detection mechanism, said synchronization mechanism producing the same synchronization results regardless of whether one or both of said first and second sets of mail are modified prior to synchronization, said synchronization mechanism coupled to said change detection mechanism; and
   - a processor for running said change detection mechanism and said synchronization mechanism, said processor coupled to said memory.

9. The system of claim 8 wherein said change detection mechanism further comprises:
   - an error correction mechanism for identifying whether a mail message or folder in a given mail box is a duplicate of a corresponding mail message or folder in a modified mail box by using the contents of individual attributes of said mail message or folder.

10. The system of claim 8 wherein said synchronization mechanism further comprises a change existing mail mechanism coupled to said error correction mechanism, said change existing mail mechanism for correctly identifying a mail message or folder to update or delete without requiring said mail message or folder in said first and second set of mail to contain system assigned unique identifiers.

11. A computer system for synchronization of a first set of mail with a second set of mail at a mail message or folder level, said system comprising:
   - means for containing,
     - means for generating a change list for said first and second sets of mail, said change list listing the changes made at a mail message or folder level to said first and second sets of mail, and
     - means for synchronizing said first set of mail and said second set of mail by using the information in said change list generated by said means for generating, said means for synchronizing producing the same synchronization results regardless of whether one or both of said first and second sets of mail are modified prior to synchronization, said means for synchronizing coupled to said means for generating; and
   - means for running said means for generating and said means for synchronizing, said means for running coupled to said means for containing.

12. The system of claim 11 wherein said means for generating further comprises:
   - first means for identifying whether a mail message or folder in a given mail box is a duplicate of a corresponding mail message or folder in a modified mail box by using the contents of individual attributes of said mail message or folder; and
   - second means for identifying said duplicate which was not identified by said first means for identifying.

13. The system of claim 11 wherein said means for synchronizing further comprises means for correctly identifying a mail message or folder to update or delete without requiring said mail message or folder in said first and second set of mail to contain system assigned unique identifiers.

14. A method for synchronizing a first set of mail with a second set of mail at a mail message or folder level, said method comprising the steps of:

generating a change list for said first and second sets of mail, said change list listing the changes made at a mail message or folder level to said first and second sets of mail; and synchronizing said first set of mail with said second set of mail using said first change list generated for said first set of mail and said second change list generated for said second set of mail, said step of synchronizing producing the same synchronization results regardless of whether one or both of said first and second sets of mail are modified prior to synchronization.

15. The method of claim 14 wherein said step of generating further comprising the steps of:

identifying whether a mail message or folder in a given mail box is a duplicate of another mail message or folder in a modified mail set, said first set of mail and said second set of mail being said given mail box and said first set of mail and said second set of mail with changes being said modified mail box, and identifying said duplicate which was not identified in said step of identifying whether said message or folder is a duplicate.

16. The method of claim 14 wherein said step of synchronizing further comprising the step of changing mail messages or folders in said first set of mail and mail messages or folders in said second set of mail for synchronizing mail messages or folders in said first set of mail and said second set of mail.

* * * * *